US012574990B2

(12) United States Patent
Lee et al.

(10) Patent No.: US 12,574,990 B2
(45) Date of Patent: *Mar. 10, 2026

(54) HIERARCHICAL MOBILITY

(71) Applicant: QUALCOMM Incorporated, San Diego, CA (US)

(72) Inventors: Heechoon Lee, San Diego, CA (US); Hung Dinh Ly, San Diego, CA (US); Tingfang Ji, San Diego, CA (US); Gavin Bernard Horn, La Jolla, CA (US); Karthika Paladugu, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 668 days.

This patent is subject to a terminal disclaimer.

(21) Appl. No.: 17/875,921

(22) Filed: Jul. 28, 2022

(65) Prior Publication Data

US 2022/0369413 A1 Nov. 17, 2022

Related U.S. Application Data

(63) Continuation of application No. 16/732,217, filed on Dec. 31, 2019, now Pat. No. 11,438,955.

(Continued)

(51) Int. Cl.
*H04W 76/27* (2018.01)
*H04B 7/06* (2006.01)
(Continued)

(52) U.S. Cl.
CPC ........ *H04W 76/27* (2018.02); *H04B 7/06952* (2023.05); *H04W 8/02* (2013.01);
(Continued)

(58) Field of Classification Search
CPC ....... H04W 76/27; H04W 8/02; H04W 16/28; H04W 56/001; H04W 68/02;
(Continued)

(56) References Cited

U.S. PATENT DOCUMENTS 8,767,606 B2 7/2014 Yi et al.
8,811,252 B2 8/2014 Maeda et al.
(Continued)

FOREIGN PATENT DOCUMENTS

EP 3419378 A1 12/2018
EP 3562227 A1 10/2019
(Continued)

OTHER PUBLICATIONS

"3rd Generation Partnership Project; Technical Specification Group Radio Access Network; NR; NR and NG-RAN Overall Description, Stage 2 (Release 15)", 3GPP Draft, R2-1706205, 38300-040RM, 3rd Generation Partnership Project (3GPP), Mobile Competence Centre, 650, Route Des Lucioles, F-06921, Sophia-Antipolis Cedex, France, Jun. 9, 2017 (Jun. 9, 2017), XP051286007, 54 pages, Retrieved from the Internet: URL: http://www.3gpp.org/ftp/tsg_ran/ WG2_RL2/TSGR2_98/Docs/ - [retrieved on Jun. 9, 2017], sections 4, 7-9.

(Continued)

*Primary Examiner* — Ricky Q Ngo
*Assistant Examiner* — David M Kayal
(74) *Attorney, Agent, or Firm* — Holland & Hart LLP

(57) ABSTRACT

Techniques are described herein for signaling procedures that use a hierarchical mobility, which may be applied when a user equipment (UE) is operating in a radio resource control (RRC) inactive state or the RRC idle state. A wireless communication system may be configured with a plurality of areas in which one or more networks are established for communicating certain types of signals.

(Continued)

Identify a network area associated with a UE operating in a radio resource control inactive state or a radio resource control idle state
~1805

Identify, based on the network area, communication resources assigned for the one or more network synchronization signals or the one or more network paging signals different than communication resources of neighboring network areas, where transmitting the one or more network synchronization signals or the one or more network paging signals within the network area is based on identifying the communication resources
~1810

Transmit one or more network synchronization signals or one or more network paging signals within the network area based on the network area
~1815

~1800

Examples of the areas associated with networks may include a tracking area (TA), a radio access network area code (RAN-AC), a radio access network based notification area (RNA). A synchronization signal or a paging signal may be transmitted using a first set of communication resources in a first area, while the synchronization signal or the paging signal may be transmitted using a second set of communication resources in a second area different than the first set of communication resources.

28 Claims, 18 Drawing Sheets

Related U.S. Application Data

(60) Provisional application No. 62/788,028, filed on Jan. 3, 2019.

(51) Int. Cl.

| | |
|---|---|
| *H04W 8/02* | (2009.01) |
| *H04W 16/28* | (2009.01) |
| *H04W 56/00* | (2009.01) |
| *H04W 68/02* | (2009.01) |

(52) U.S. Cl.
CPC ......... *H04W 16/28* (2013.01); *H04W 56/001* (2013.01); *H04W 68/02* (2013.01)

(58) Field of Classification Search
CPC ... H04W 60/00; H04W 8/08; H04W 56/0015; H04B 7/0695; H04B 7/04
See application file for complete search history.

(56) References Cited

U.S. PATENT DOCUMENTS

| | | |
|---|---|---|
| 9,225,536 B2 | 12/2015 | Jiao |
| 2007/0105568 A1 | 5/2007 | Nylander et al. |
| 2010/0272004 A1 | 10/2010 | Maeda et al. |
| 2014/0071957 A1* | 3/2014 | Xu .................... H04W 52/0219 |
| | | 370/336 |
| 2014/0269482 A1 | 9/2014 | Pandey et al. |
| 2014/0362756 A1* | 12/2014 | Maeda .................. H04L 5/0007 |
| | | 370/312 |
| 2016/0050626 A1* | 2/2016 | Chen .................... H04W 68/02 |
| | | 370/311 |
| 2016/0119395 A1 | 4/2016 | Li et al. |
| 2016/0270013 A1* | 9/2016 | Soriaga ............ H04W 56/0015 |
| 2018/0206246 A1 | 7/2018 | Zhang et al. |
| 2018/0270699 A1 | 9/2018 | Babaei et al. |
| 2018/0270700 A1 | 9/2018 | Babaei et al. |
| 2018/0270713 A1 | 9/2018 | Park et al. |
| 2018/0270791 A1* | 9/2018 | Park ..................... H04W 68/04 |
| 2018/0270792 A1 | 9/2018 | Park et al. |
| 2018/0270894 A1 | 9/2018 | Park et al. |
| 2018/0270895 A1 | 9/2018 | Park et al. |
| 2018/0279229 A1 | 9/2018 | Dinan et al. |
| 2018/0279358 A1 | 9/2018 | Babaei et al. |
| 2019/0110243 A1 | 4/2019 | Chun et al. |
| 2019/0182767 A1 | 6/2019 | Deng et al. |
| 2019/0230626 A1 | 7/2019 | Rune et al. |
| 2019/0261258 A1 | 8/2019 | Lindoff et al. |
| 2019/0281485 A1 | 9/2019 | Da Silva et al. |
| 2019/0349891 A1 | 11/2019 | Rune et al. |
| 2019/0364544 A1 | 11/2019 | Parkvall et al. |
| 2020/0036430 A1 | 1/2020 | Kim et al. |
| 2020/0221530 A1* | 7/2020 | Lee ......................... H04W 8/02 |
| 2023/0379884 A1* | 11/2023 | Martin .................. H04W 72/23 |

FOREIGN PATENT DOCUMENTS

| | | |
|---|---|---|
| WO | WO2018143415 A1 | 8/2018 |
| WO | WO2018204703 A1 | 11/2018 |

OTHER PUBLICATIONS

International Preliminary Report on Patentability—PCT/US2020/012083, The International Bureau of WIPO—Geneva, Switzerland, Jul. 15, 2021.
International Search Report and Written Opinion—PCT/US2020/012083—ISA/EPO—Apr. 9, 2020.

* cited by examiner 710                    715                    720

705

700

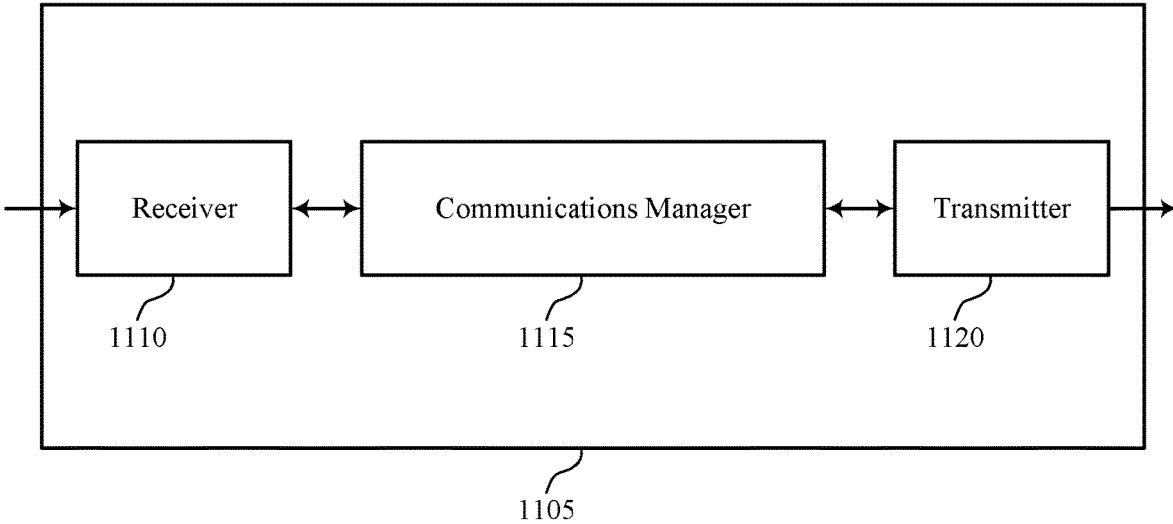
1110             1115             1120
1105
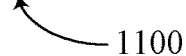
1100
FIG. 11

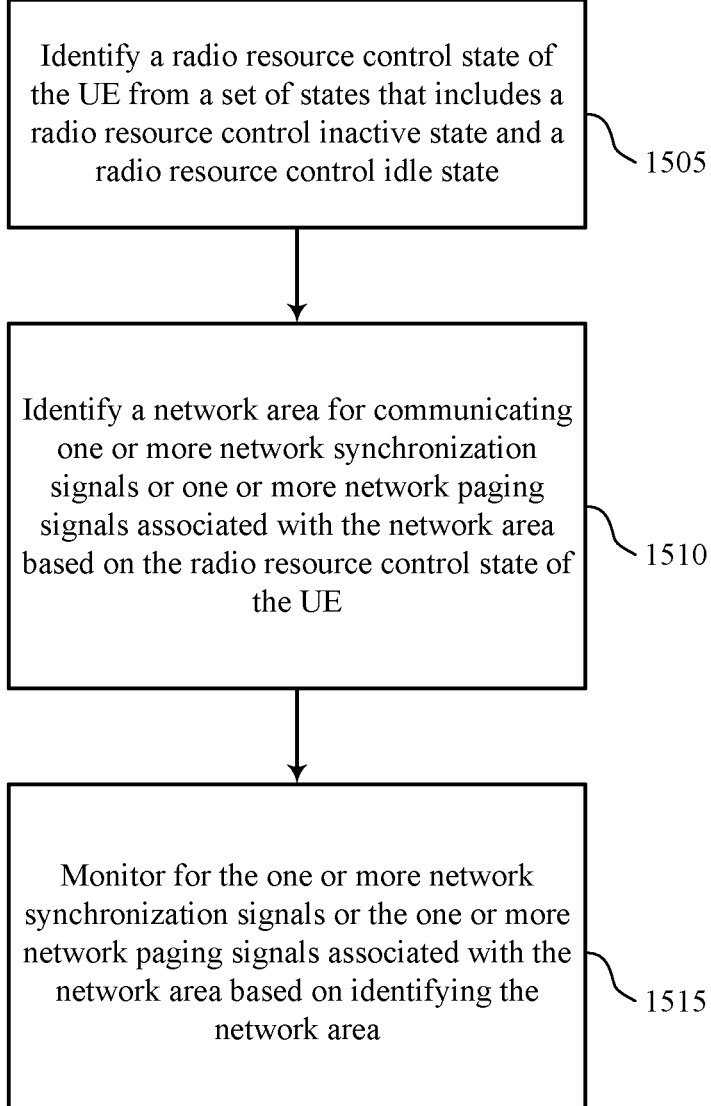

Identify a radio resource control state of the UE from a set of states that includes a radio resource control inactive state and a radio resource control idle state

1505

Identify a network area for communicating one or more network synchronization signals or one or more network paging signals associated with the network area based on the radio resource control state of the UE

1510

Monitor for the one or more network synchronization signals or the one or more network paging signals associated with the network area based on identifying the network area

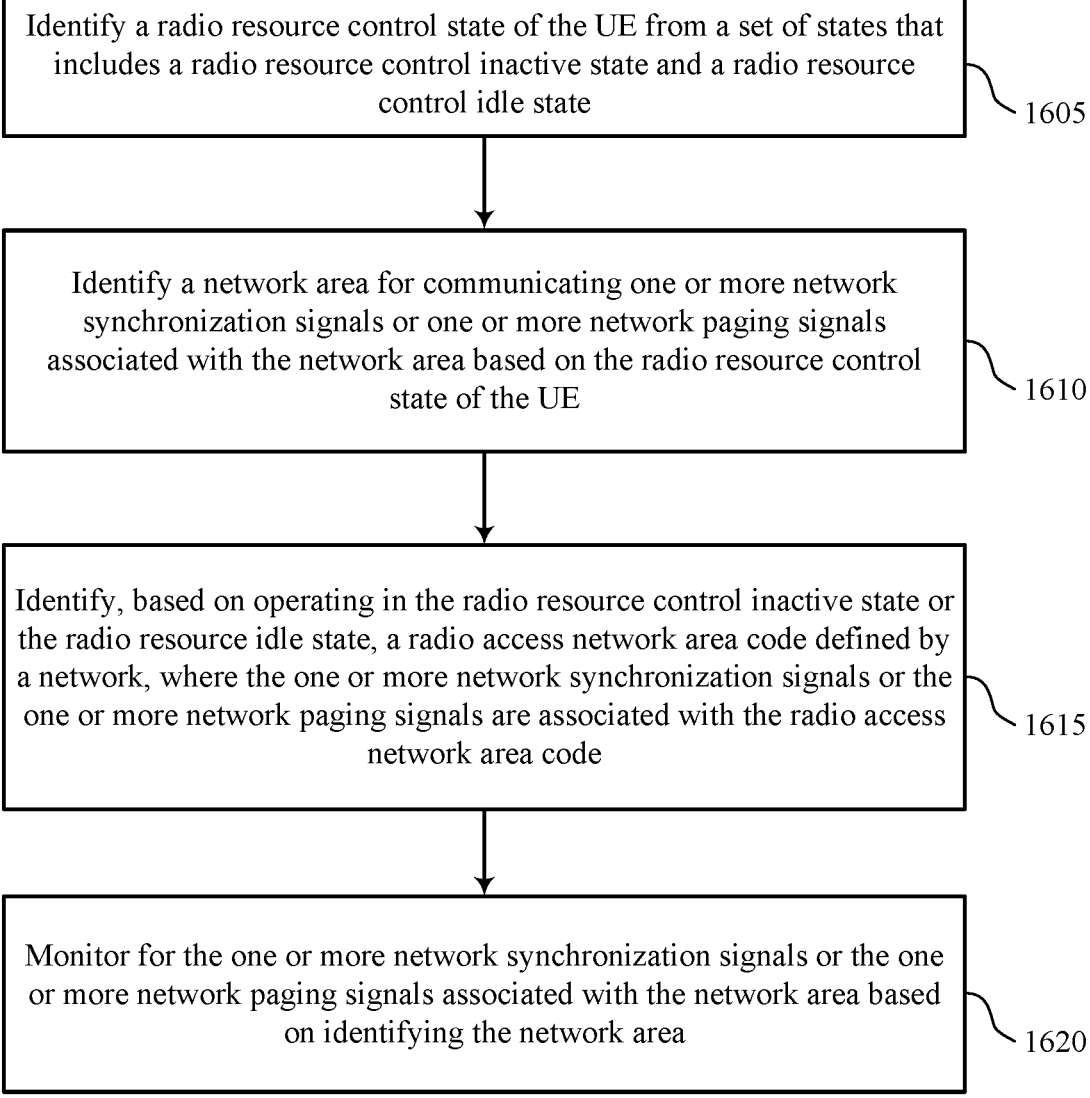

Identify a radio resource control state of the UE from a set of states that includes a radio resource control inactive state and a radio resource control idle state

1605

Identify a network area for communicating one or more network synchronization signals or one or more network paging signals associated with the network area based on the radio resource control state of the UE

1610

Identify, based on operating in the radio resource control inactive state or the radio resource idle state, a radio access network area code defined by a network, where the one or more network synchronization signals or the one or more network paging signals are associated with the radio access network area code

1615

Monitor for the one or more network synchronization signals or the one or more network paging signals associated with the network area based on identifying the network area

Identify a network area associated with a
UE operating in a radio resource control
inactive state or a radio resource control
idle state

1705

Transmit one or more network
synchronization signals or one or more
network paging signals within the network
area based on the network area

1710

1700

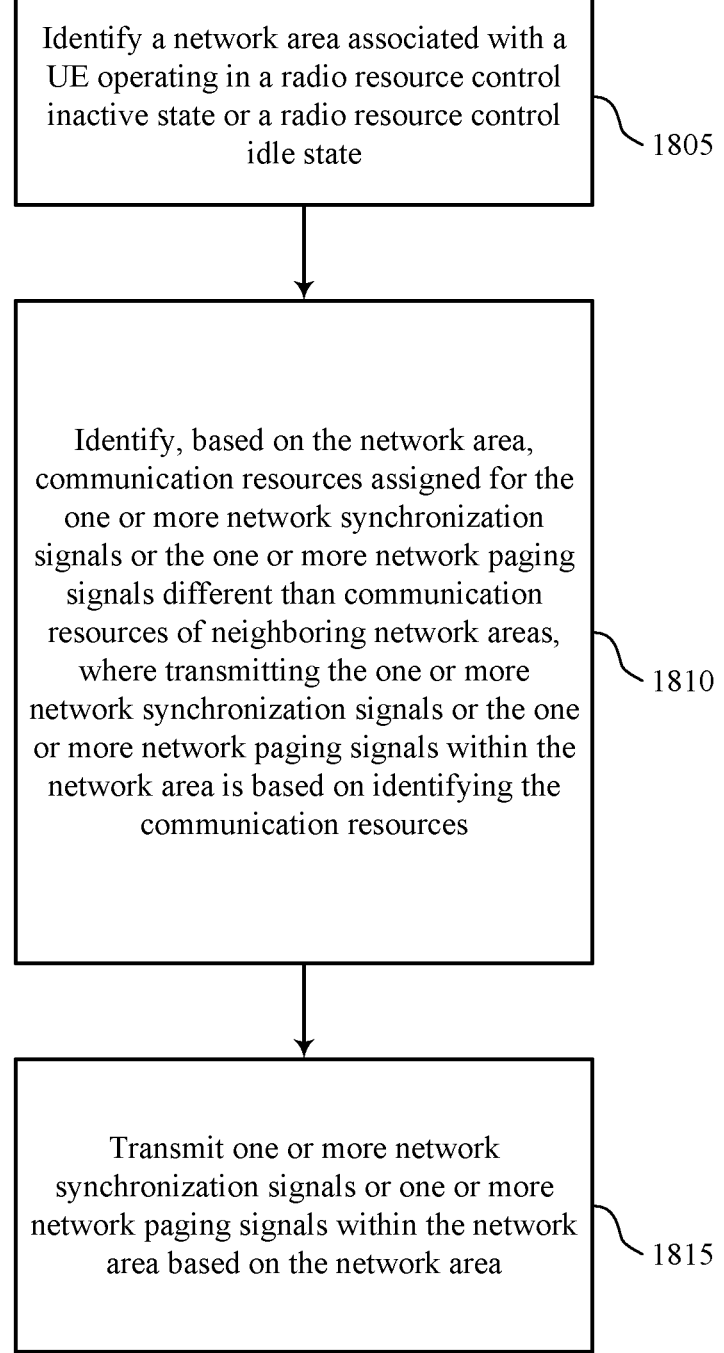

Identify a network area associated with a UE operating in a radio resource control inactive state or a radio resource control idle state

1805

Identify, based on the network area, communication resources assigned for the one or more network synchronization signals or the one or more network paging signals different than communication resources of neighboring network areas, where transmitting the one or more network synchronization signals or the one or more network paging signals within the network area is based on identifying the communication resources

1810

Transmit one or more network synchronization signals or one or more network paging signals within the network area based on the network area

HIERARCHICAL MOBILITY

CROSS REFERENCE

The present Application for Patent is a Continuation of U.S. patent application Ser. No. 16/732,217 by LEE et al., entitled "HIERARCHICAL MOBILITY" filed Dec. 31, 2019, which claims the benefit of U.S. Provisional Patent Application No. 62/788,028 by LEE, et al., entitled "HIER-ARCHICAL MOBILITY," filed Jan. 3, 2019, assigned to the assignee hereof, and expressly incorporated by reference herein.

BACKGROUND

The following relates generally to wireless communications, and more specifically to hierarchical mobility.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communication system may include a number of base stations or network access nodes, each simultaneously supporting communication for multiple communication devices, which may be otherwise known as user equipment (UE).

Some wireless communication systems may use directional beams to communicate some information. Because directional beams serve a limited geographic coverage area, some signals may be transmitted over multiple beams in a beam-sweeping pattern. Such beam-sweeping may use more communication resources than omnidirectional communications.

SUMMARY

The described techniques relate to improved methods, systems, devices, and apparatuses that support hierarchical mobility. Generally, the described techniques provide for signaling procedures that use a hierarchical mobility, which may be applied when a user equipment (UE) is operating in a radio resource control (RRC) inactive state or the RRC idle state, among other cases. A wireless communication system may be configured with a plurality of areas in which one or more networks (e.g., a single-frequency network (SFN)) are established for communicating certain types of signals. Non-limiting examples of the areas associated with networks may include a tracking area (TA), a radio access network area code (RAN-AC), a radio access network based notification area (RNA). A signal, such as a synchronization signal or a paging signal, may be transmitted using a first set of communication resources in a first area, while the signal may be transmitted using a second set of communication resources in a second area different than the first set of communication resources.

A method of wireless communication is described. The method may include identifying a radio resource control state of a user equipment from a set of states that includes a radio resource control inactive state and a radio resource control idle state, identifying a network area for communicating one or more network synchronization signals or one or more network paging signals associated with the network area based on the radio resource control state of the user equipment, and monitoring, by the user equipment, for the one or more network synchronization signals or the one or more network paging signals associated with the network area based on identifying the network area.

An apparatus for wireless communication is described. The apparatus may include a processor, memory in electronic communication with the processor, and instructions stored in the memory. The instructions may be executable by the processor to cause the apparatus to identify a radio resource control state of a user equipment from a set of states that includes a radio resource control inactive state and a radio resource control idle state, identify a network area for communicating one or more network synchronization signals or one or more network paging signals associated with the network area based on the radio resource control state of the user equipment, and monitor, by the user equipment, for the one or more network synchronization signals or the one or more network paging signals associated with the network area based on identifying the network area.

Another apparatus for wireless communication is described. The apparatus may include means for identifying a radio resource control state of a user equipment from a set of states that includes a radio resource control inactive state and a radio resource control idle state, identifying a network area for communicating one or more network synchronization signals or one or more network paging signals associated with the network area based on the radio resource control state of the user equipment, and monitoring, by the user equipment, for the one or more network synchronization signals or the one or more network paging signals associated with the network area based on identifying the network area.

A non-transitory computer-readable medium storing code for wireless communication is described. The code may include instructions executable by a processor to identify a radio resource control state of a user equipment from a set of states that includes a radio resource control inactive state and a radio resource control idle state, identify a network area for communicating one or more network synchronization signals or one or more network paging signals associated with the network area based on the radio resource control state of the user equipment, and monitor, by the user equipment, for the one or more network synchronization signals or the one or more network paging signals associated with the network area based on identifying the network area.

Some examples of the method, apparatuses, and non-transitory computer-readable medium described herein may further include operations, features, means, or instructions for receiving, by the user equipment, the one or more network synchronization signals or the one or more network paging signals associated with the network area based on monitoring for the one or more network synchronization signals or the one or more network paging signals.

Some examples of the method, apparatuses, and non-transitory computer-readable medium described herein may further include operations, features, means, or instructions for identifying one or more characteristics common to the one or more network synchronization signals or the one or more network paging signals communicated within the network area, where monitoring for the one or more network synchronization signals or the one or more network paging signals may be based on identifying the one or more characteristics common to the one or more network synchronization signals or the one or more network paging signals.

In some examples of the method, apparatuses, and non-transitory computer-readable medium described herein, identifying the network area may include operations, features, means, or instructions for identifying, based on the user equipment operating in the radio resource control inactive state or the radio resource idle state, a radio access network area code defined by a network, where the one or more network synchronization signals or the one or more network paging signals may be associated with the radio access network area code.

In some examples of the method, apparatuses, and non-transitory computer-readable medium described herein, identifying the radio resource control state of the user equipment may include operations, features, means, or instructions for identifying that the user equipment may be operating in the radio resource control inactive state, where identifying the radio access network area code may be based on identifying that the user equipment may be operating in the radio resource control inactive state.

In some examples of the method, apparatuses, and non-transitory computer-readable medium described herein, identifying the network area may include operations, features, means, or instructions for identifying, based on the user equipment operating in the radio resource control inactive state, a radio access network based notification area defined by the user equipment, where the one or more network synchronization signals or the one or more network paging signals may be associated with the radio access network based notification area.

In some examples of the method, apparatuses, and non-transitory computer-readable medium described herein, identifying the radio resource control state of the user equipment may include operations, features, means, or instructions for identifying that the user equipment may be operating in the radio resource control inactive state, where identifying the radio access network based notification area may be based on identifying that the user equipment may be operating in the radio resource control inactive state.

In some examples of the method, apparatuses, and non-transitory computer-readable medium described herein, the radio access network based notification area includes a set of radio access network area codes.

In some examples of the method, apparatuses, and non-transitory computer-readable medium described herein, identifying the network area may include operations, features, means, or instructions for identifying, based on the user equipment operating in the radio resource control idle state, a tracking area defined by a network, where the one or more network synchronization signals or the one or more network paging signals may be associated with the tracking area.

In some examples of the method, apparatuses, and non-transitory computer-readable medium described herein, identifying the radio resource control state of the user equipment may include operations, features, means, or instructions for identifying that the user equipment may be operating in the radio resource control idle state, where identifying the tracking area may be based on identifying that the user equipment may be operating in the radio resource control idle state.

Some examples of the method, apparatuses, and non-transitory computer-readable medium described herein may further include operations, features, means, or instructions for receiving a network paging message based on monitoring for the one or more network synchronization signals or the one or more network paging signals associated with the network area, and entering a radio resource control connected state based on receiving the network paging message.

In some examples of the method, apparatuses, and non-transitory computer-readable medium described herein, identifying the radio resource control state further may include operations, features, means, or instructions for entering, by the user equipment, the radio resource control inactive state or the radio resource control idle state.

In some examples of the method, apparatuses, and non-transitory computer-readable medium described herein, the one or more network synchronization signals or the one or more network paging signals include a single-beam signal communicated over a millimeter wave network.

In some examples of the method, apparatuses, and non-transitory computer-readable medium described herein, identifying the network area may include operations, features, means, or instructions for identifying a single-frequency network area for communicating the one or more network synchronization signals or the one or more network paging signals, where the one or more network synchronization signals or the one or more network paging signals are associated with the single-frequency network area.

A method of wireless communication is described. The method may include identifying a network area associated with a user equipment operating in a radio resource control inactive state or a radio resource control idle state and transmitting, by a base station, one or more network synchronization signals or one or more network paging signals within the network area based on the network area.

An apparatus for wireless communication is described. The apparatus may include a processor, memory in electronic communication with the processor, and instructions stored in the memory. The instructions may be executable by the processor to cause the apparatus to identify a network area associated with a user equipment operating in a radio resource control inactive state or a radio resource control idle state and transmit, by a base station, one or more network synchronization signals or one or more network paging signals within the network area based on the network area.

Another apparatus for wireless communication is described. The apparatus may include means for identifying a network area associated with a user equipment operating in a radio resource control inactive state or a radio resource control idle state and transmitting, by a base station, one or more network synchronization signals or one or more network paging signals within the network area based on the network area.

A non-transitory computer-readable medium storing code for wireless communication is described. The code may include instructions executable by a processor to identify a network area associated with a user equipment operating in a radio resource control inactive state or a radio resource control idle state and transmit, by a base station, one or more network synchronization signals or one or more network paging signals within the network area based on the network area.

Some examples of the method, apparatuses, and non-transitory computer-readable medium described herein may further include operations, features, means, or instructions for identifying, based on the network area, communication resources assigned for the one or more network synchronization signals or the one or more network paging signals different than communication resources of neighboring network areas, where transmitting the one or more network synchronization signals or the one or more network paging signals within the network area may be based on identifying the communication resources.

Some examples of the method, apparatuses, and non-transitory computer-readable medium described herein may further include operations, features, means, or instructions for identifying data to be communicated with the user equipment operating in the radio resource control inactive state or the radio resource control idle state, and identifying the network area associated with the user equipment and associated with a radio resource control state of the user equipment based on identifying the data, where transmitting the one or more network paging signals may be based on identifying the network area associated with the user equipment.

Some examples of the method, apparatuses, and non-transitory computer-readable medium described herein may further include operations, features, means, or instructions for establishing a radio resource control connection with the user equipment, and identifying that the user equipment enters the radio resource control inactive state or the radio resource control idle state based on establishing the radio resource control connection, where identifying the data to be communicated with the user equipment may be based on identifying that the user equipment enters the radio resource control inactive state or the radio resource control idle state.

Some examples of the method, apparatuses, and non-transitory computer-readable medium described herein may further include operations, features, means, or instructions for identifying that the user equipment may be operating in a radio resource control connected state based on transmitting the one or more network synchronization signals or the one or more network paging signals within the network area, and transmitting the data to be communicated to the user equipment based on identifying that the user equipment may be operating in the radio resource control connected state.

Some examples of the method, apparatuses, and non-transitory computer-readable medium described herein may further include operations, features, means, or instructions for receiving an indication of a radio access network based notification area established by the user equipment, where identifying the network area may be based on the indication of the radio access network based notification area received from the user equipment.

In some examples of the method, apparatuses, and non-transitory computer-readable medium described herein, the user equipment operates in the radio resource control inactive state, and the network area may be a radio access network area code defined by a network.

In some examples of the method, apparatuses, and non-transitory computer-readable medium described herein, the user equipment operates in the radio resource control inactive state, and the network area may be a radio access network based notification area established by the user equipment.

In some examples of the method, apparatuses, and non-transitory computer-readable medium described herein, the user equipment operates in the radio resource control idle state, and the network area may be a tracking area.

In some examples of the method, apparatuses, and non-transitory computer-readable medium described herein, the one or more network synchronization signals or the one or more network paging signals include a single-beam signal communicated over a millimeter wave network.

In some examples of the method, apparatuses, and non-transitory computer-readable medium described herein, identifying the network area may include operations, features, means, or instructions for identifying a single-frequency network area associated with the user equipment.

BRIEF DESCRIPTION OF THE DRAWINGS

FIGS. 11 and 12 show block diagrams of devices that support hierarchical mobility in accordance with aspects of the present disclosure.

FIGS. 15 through 18 show flowcharts illustrating methods that support hierarchical mobility in accordance with aspects of the present disclosure.

DETAILED DESCRIPTION

Some wireless communication systems may use directional beams transmitted in a beam-sweeping pattern to communicate some information. Beam sweeping may be used to account for the limited geographic area covered by each individual directional beam. Beam-sweeping, however, may use more communication resources than omnidirectional communications, in some cases. For example, when a user equipment (UE) is operating in a radio resource control (RRC) inactive state or an RRC idle state, a base station may transmit one or more signals, such as synchronization signals or paging signals, to the UE. Such signaling may use more communication resources when done using directional beams and beam-sweeping.

Techniques are described herein for signaling procedures that use a hierarchical mobility. Procedures that use hierarchical mobility may reduce the amount of communication resources that are used communicate some signals, such as synchronization signals or some paging signals, compared to using beam-sweeping procedures or other techniques. Hierarchical mobility may be applied when the UE is operating in one or more states, for example in the RRC inactive state or the RRC idle state. In hierarchal mobility, a wireless communication system may be configured with a plurality of areas in which one or more networks (e.g., a single-frequency network (SFN)) are established for communicating certain types of signals. Examples of the areas that may be used to establish networks may include a tracking area (TA), a radio access network (RAN) area code (RAN-AC), a radio access network based notification area (RNA). A signal, such as a synchronization signal or a paging signal, may be transmitted using a first set of communication resources in a first area, while the signal may be transmitted using a second set of communication resources in a second area that is different than (e.g., neighbors) the first area. In this manner, networks may be employed without interfering with neighboring transmissions.

Aspects of the disclosure are described in the context of a wireless communication systems and a process flow. Aspects of the disclosure are further illustrated by and described with reference to apparatus diagrams, system diagrams, and flowcharts that relate to hierarchical mobility. Although some examples are discussed in the context of synchronization signals, or paging signals, or both, other examples are contemplated, and the disclosure herein is not limited to these examples.

Figure 1:
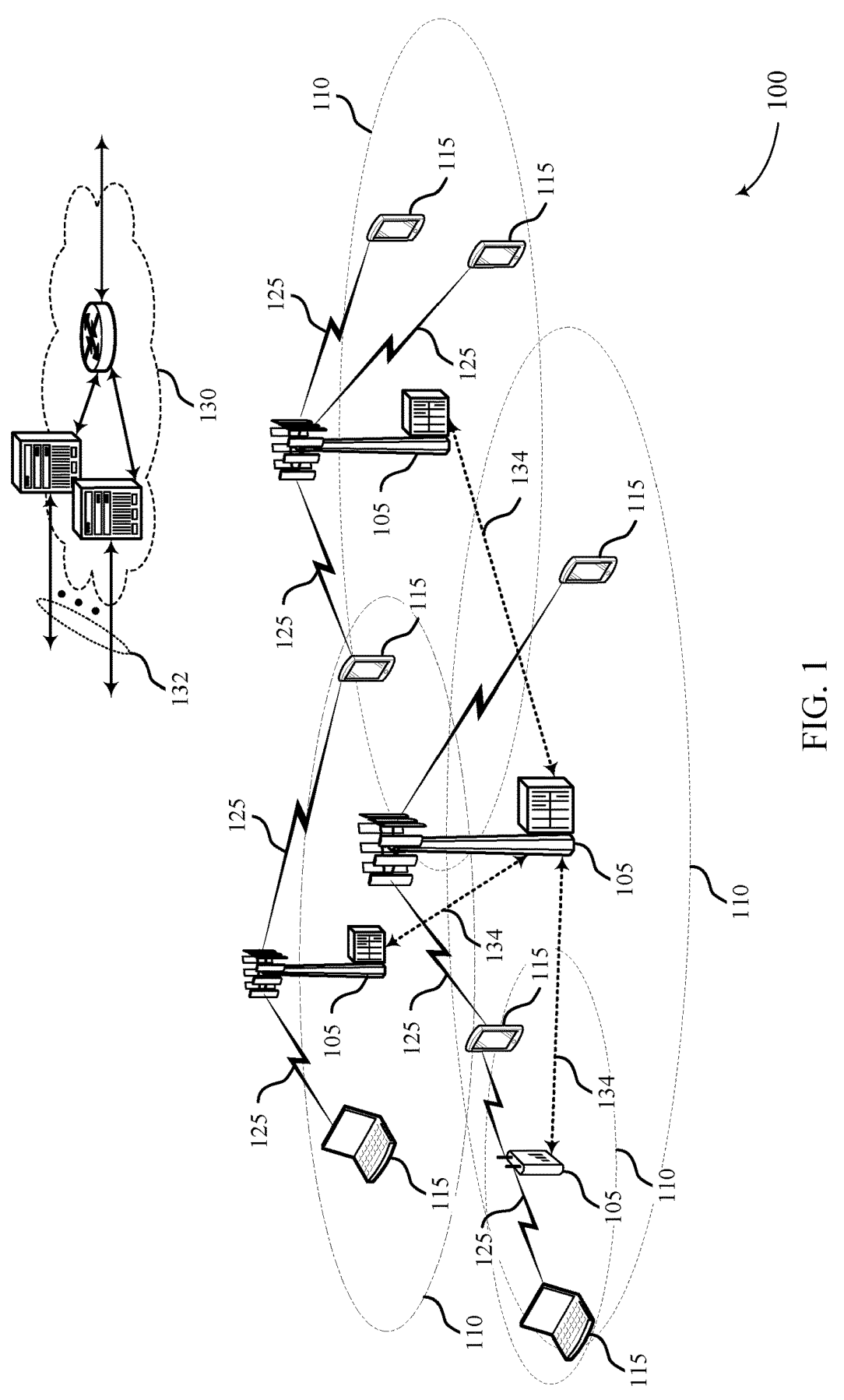
FIG. 1 illustrates an example of a system for wireless communications that supports hierarchical mobility in accordance with aspects of the present disclosure.

FIG. 1 illustrates an example of a wireless communication system 100 that supports hierarchical mobility in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Techniques are described herein for signaling procedures that use a hierarchical mobility, which may be applied when a UE 115 is operating in the RRC inactive state or the RRC idle state. The wireless communication system 100 may be configured with a plurality of areas in which one or more networks are established for communicating certain types of signals. Examples of the types of signals that may be communicated using a network associated with an area are synchronization signals, or paging signals, or both. Examples of the areas associated with networks may include a TA, a RAN-AC, or an RNA. In some examples, the network may be an SFN associated with an SFN area. A synchronization signal or a paging signal may be transmitted using a first set of communication resources in a first area, while the synchronization signal or the paging signal may be transmitted using a second set of communication resources in a second area different than the first set of communication resources.

Figure 2:
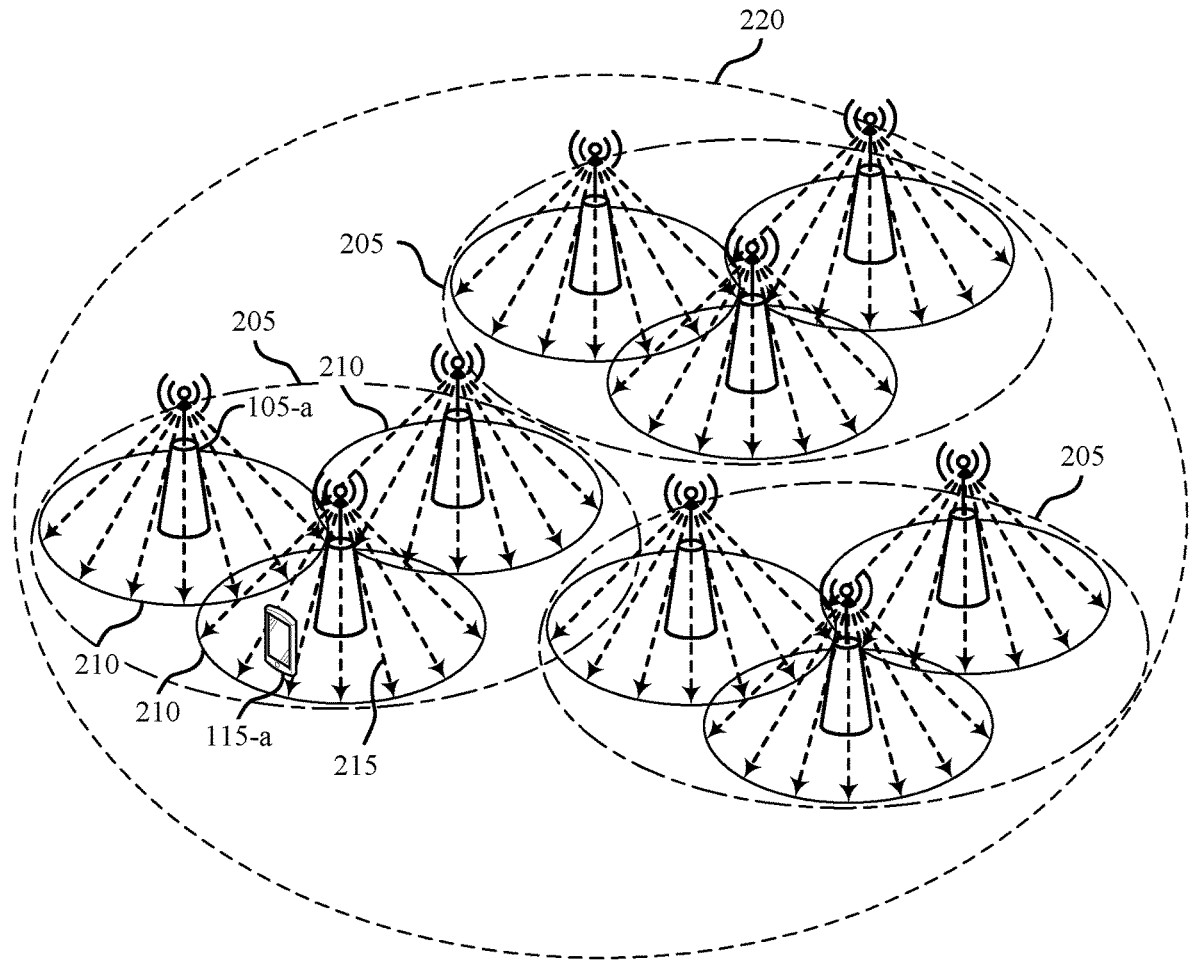
FIG. 2 illustrates an example of a wireless communication system that supports hierarchical mobility in accordance with aspects of the present disclosure.

FIG. 2 illustrates an example of a wireless communication system 200 that supports hierarchical mobility in accordance with aspects of the present disclosure. In some examples, the wireless communication system 200 may implement aspects of wireless communication system 100. The wireless communication system 200 may include one or more base stations 105-*a* and one or more UEs 115-*a*. The base stations 105-*a* may be examples of the base stations 105 described with reference to FIG. 1. In some examples, base station 105-*a* may be referred to as a network device or a next generation NodeB (gNB). The UE 115-*a* may be an example of the UEs 115 described with reference to FIG. 1.

The wireless communication system 200 may illustrate operations of and communications between the base stations 105-*a* and the UEs 115-*a* that support hierarchal mobility. A UE 115-*a* may be configured to operate in a plurality of different RRC states. The UE 115-*a* may be in a single RRC state selected from a set of RRC states at a given time. Examples of the RRC states of the UE 115-*a* may include an RRC connected state, an RRC inactive state, and an RRC idle state. The RRC idle state may be used for initial access to a network or to reduce power consumption of the UE. The RRC connected state may be used for active data transfer in the network. In some examples, the UE 115-*a* may operate in the RRC inactive state to reduce power consumption. The RRC inactive state or the RRC idle state may be associated with a discontinuous reception (DRX) state of UE 115-*a*, which may be configured by a protocol layer (e.g., RRC layer). In some examples, UE 115-*a* may perform updates in an RNA when operating in the RRC inactive state. Additionally or alternatively, UE 115-*a* may perform updates when UE 115-*a* moves outside the RNA in the RRC inactive state.

UE 115-*a* may transition between RRC states via one or more procedures. For example, the UE 115-*a* may use an establish procedure to transition from the RRC idle to the RRC connected state. In other examples, the UE 115-*a* may use a release procedure to transition from the RRC connected or RRC inactive state or from the RRC connected state to the RRC idle state. In other examples, the UE 115-*a* may use a release with suspend procedure to transition from the RRC connected state to the RRC inactive. In other examples, the UE 115-*a* may use a resume procedure to transition from the RRC inactive state to the RRC connected state.

When the UE 115-*a* is operating in the RRC inactive state or the RRC idle state, the UE 115-*a* may monitor for a variety of different signals to maintain the communication link with the network. For example, the UE 115-*a* may monitor for synchronization signals (SSs) or for paging signals. The UE 115-*a* may monitor for monitor for synchronization signals (e.g., primary synchronization signal or secondary synchronization signal) to obtain or maintain the cell identity or to obtain or maintain the frame timing, among other things. The UE 115-*a* may monitor for paging signals from the network when in a DRX mode (e.g., RRC idle state or RRC inactive state) that indicate the network (e.g., the base station 105-*a*) includes information waiting to be communicated to the UE 115-*a*. For example, the base station 105-*a* may receive an incoming call or incoming data that is addressed to the UE 115-*a*. The base station 105-*a* may transmit a paging to the UE 115-*a* based on receiving the incoming call or data.

The wireless communication system 200 may be configured to use millimeter-wave (mmW) spectrum to communicate data between the base station 105-*a* and the UE 115-*a*. Communications sent over mmW spectrum may be transmitted using directional beams formed using beamforming techniques. Such directional beams may have limited spatial coverage. In some cases, network may transmit some signals using beam sweeping to address issues that arise from the limited spatial coverage of directional beams in the mmW spectrum. Transmitting some signals by beam-sweeping directional beams may use increase the amount of communication resources used to communicate such signals. For example, the network may transmit synchronization signals or paging signals transmitted via one or more beam sweeps. In such examples, the UE 115-*a* may monitor for SSs or paging signals that have been transmitted using multiple directional beams 215 via a multi-beam monitoring procedure. In some cases, UE 115-*a* may monitor for paging over the RNA based on UE 115-*a* having the RRC inactive state. In some cases, UE 115-*a* may monitor paging over a TA 220 based on UE 115-*a* being in the RRC idle state. In some examples, the TA may include one or more RNAs.

The network (e.g., base station 105-*a*) may transmit a SS block (SSB) or an SSB set in mmW spectrum using a beam-sweeping procedure. The SSB or the SSB set may include one or more of a primary SS (PSS), a secondary SS (SSS), and a physical broadcast channel (PBCH). The SSB set may include a number of SSBs, where the number of SSBs that can be used may be based on a frequency spectrum, or a sub-carrier spacing (SCS) of the frequency spectrum, or both. In some examples, the SCS may be 15 kilohertz (kHz) or 30 kHz. In some examples, the UE 115-*a* may monitor for the SSB or SSB set during a 20 millisecond (ms) period or the UE 115-*a* may monitor for the SSB set in a frequency spectrum below 3 gigahertz (GHz) or in a frequency spectrum between 3 GHz and 6 GHz. UE 115-*a* may monitor for one or more mapping options in the 30 kHz SCS based on a band of the frequency spectrum.

In some cases, when UE 115-*a* monitors for the SSB set in the frequency spectrum below three (3) GHz, a first four (4) SSBs of the SSB set may be used. In some examples, when the SCS is 15 kHz, UE 115-*a* may monitor for the SSB set in a first two (2) ms of the 20 ms time period. In some examples, when the SCS is 30 kHz, UE 115-*a* may monitor for the SSB set in a first one (1) ms of the 20 ms time period.

In some cases, when UE 115-*a* monitors for the SSB set in the frequency spectrum between 3 GHz and 6 GHz, a first eight (8) SSBs of the SSB set may be used. In some examples, when the SCS is 15 kHz, UE 115-*a* may monitor for the SSB set in a first four (4) ms of the 20 ms time period. In some examples, when the SCS is 30 kHz, UE 115-*a* may monitor for the SSB set in a first two (2) ms of the 20 ms time period.

Transmitting directional beams using a beam-sweeping pattern or monitoring for such signals may use more communication resources compared to a single beam procedure (e.g., in the sub-6 GHz frequency spectrum band). In some examples, monitoring for a multi-beam SSB or SSB set may require the UE 115-*a* to perform additional processing or a longer radio frequency (RF) ON time compared to monitoring for a single-beam SSB or SSB set. Additionally or alternatively, the multi-beam monitoring procedure may be associated with multi-beam paging, which may lead to other signaling inefficiencies.

Techniques are described herein for signaling procedures that use a hierarchical mobility. Procedures that use hierarchical mobility may reduce the amount of signaling and resources used to communicate synchronization signals or paging signals when the UE 115-*a* is operating in the RRC inactive state or the RRC idle state. In hierarchal mobility, the wireless communication system 200 may be configured with a plurality of areas (e.g., a TA, a RAN-AC, or an RNA) in which one or more networks are established for certain types of signals. A synchronization signal or a paging signal may be transmitted using a first set of communication resources in a first area, while the synchronization signal or the paging signal may be transmitted using a second set of communication resources in a second area that neighbors the first area. In this manner, networks may be employed without interfering with neighboring transmissions.

In some cases, the network may be associated with a network area, which may correspond to one or more of a cell 210, an RNA, a RAN-AC 205, or a TA 220, or a combination thereof. In some examples, the network area may be an SFN area. The network may be associated with one or more network SSs or with one or more network paging signals. UE 115-*a* may monitor for the one or more network SSs or the one or more network paging signals while in the RRC idle state or the RRC inactive state. The communication resources used to communicate the one or more network SSs or the one or more network paging signals may be associated with a cell 210, an RNA, a RAN-AC 205, or a TA 220, or a combination thereof. The RAN-AC may be associated with one or more cells 210.

UE 115-*a* may operate according to the hierarchical mobility in one or more frequency spectrum bands. In some examples, UE 115-*a* may operate according to the hierarchical mobility in frequency spectrums associated with frequency spectrum bands below 6 GHz. Additionally or alternatively, UE 115-*a* may operate according to the hierarchical mobility in frequency spectrum bands 6 GHz and above (e.g., mmW spectrum). In some examples, the one or more network SSs or the one or more network paging signals may be communicated using a single-beam signal communicated over the mmW network.

To facilitate hierarchical mobility, the coverage area of the network may be divided into one or more zones. The UE 115-*a* may identify the one or more zones. In some examples, each zone of the one or more zones may correspond to an update area. In some examples, the zone used in the hierarchical mobility may be based on the RRC state in which the UE 115-*a* is operating. In some examples, when the UE 115-*a* is operating in the RRC idle state the one or more zones may correspond to one or more TAs 220 or one or more RAN-ACs 205. Additionally or alternatively, when the UE 115-*a* is operating in the RRC inactive state, the UE 115-*a* may identify that the one or more zones correspond to one or more RNAs or one or more RAN-ACs 205. Each zone of the one or more zones may include one or more RAN-ACs. Each RAN-AC of the one or more RAN-ACs may include one or more cells 210. The network may define the one or more RAN-ACs for used for the UEs 115-*a*.

In some cases, UE 115-*a* may identify an RNA associated with UE 115-*a* based on signaling from a base station 105-*a*. In some examples, the RNA may include one or more cells 210. Each cell 210 may be associated with a cell identity and a RAN-AC. UE 115-*a* may receive a system information block (SIB) identifying the cell identity. Additionally or alternatively, the RNA may include one or more RAN-ACs 205, which in turn may include one or more cells 210.

In some cases, the network or UE 115-*a* may define the RNA. In some examples, the network may define RNA over one or more TAs 220. In some examples, the network may define the RNA based on information received from the UE 115-*a*. In some examples, the network may define a boundary of the RNA corresponding to UE 115-*a* based on identifying a mobility of UE 115-*a* (e.g., a speed with which the UE 115-*a* moves through the coverage area of the base station 105-*a* or network). The boundary of the RNA corresponding to a first UE may be different than a boundary of another RNA corresponding to a second UE. In some examples, UE 115-*a* may move relatively fast through the coverage area and thus may have a high mobility. In other examples, UE 115-*a* move relatively slow through the coverage area and thus may have a low mobility.

In some examples, the RNA may include one or more RAN-ACs 205. The network may identify one or more network areas associated with UE 115-*a*, where a network area corresponds to a TA 220, a RAN-AC 205, or an RNA. In some examples, the one or more network areas may include one or more SFN areas. UE 115-*a* may monitor for network SSs based on the network area associated with UE 115-*a*.

In some examples, RNA may include one or more RAN-ACs 205 or one or more cells 210. In such examples, the network area may correspond to RNA. The UE 115-*a* may monitor for network SSs based on the RNA associated with UE 115-*a*. In some cases, the network may transmit network SSs based on the boundary of RNA corresponding to one or more UEs 115.

The network may include a network paging controller. The network paging controller may be configured to synchronize network paging transmission for each of the one or more network areas (e.g., TA 220, RAN-AC 205, or the RNA).

In some examples, UE 115-*a* may monitor idle paging from a core network 130 and for inactive paging from a base station 105-*a* while in the RRC inactive state. Idle paging may correspond to paging signals associated with core network paging. Inactive paging may correspond to paging signals associated with RAN paging. The network may lose a context of UE 115-*a* due to a failure or malfunction and perform idle paging for UE 115-*a* in the RRC inactive state. In some examples, UE 115-*a* may monitor for the idle paging and the inactive paging on a single physical channel. UE 115-*a* may distinguish the idle paging and the inactive paging based on an identifier included in a paging message.

UE 115-*a* may receive network paging signals, which may include the idle paging or the inactive paging. In some examples, the network paging signals may include paging from core network 130 or paging from a RAN associated with UE 115-*a*. The network paging may include an indication whether the paging is received from core network 130 or from the RAN associated with UE 115-*a*.

UE 115-*a* may perform a random access channel (RACH) procedure in the hierarchical mobility. UE 115-*a* may acquire a serving cell 210 to perform the RACH procedure. UE 115-*a* may perform the RACH procedure based on the RAN-AC associated with UE 115-*a*.

Figure 3:
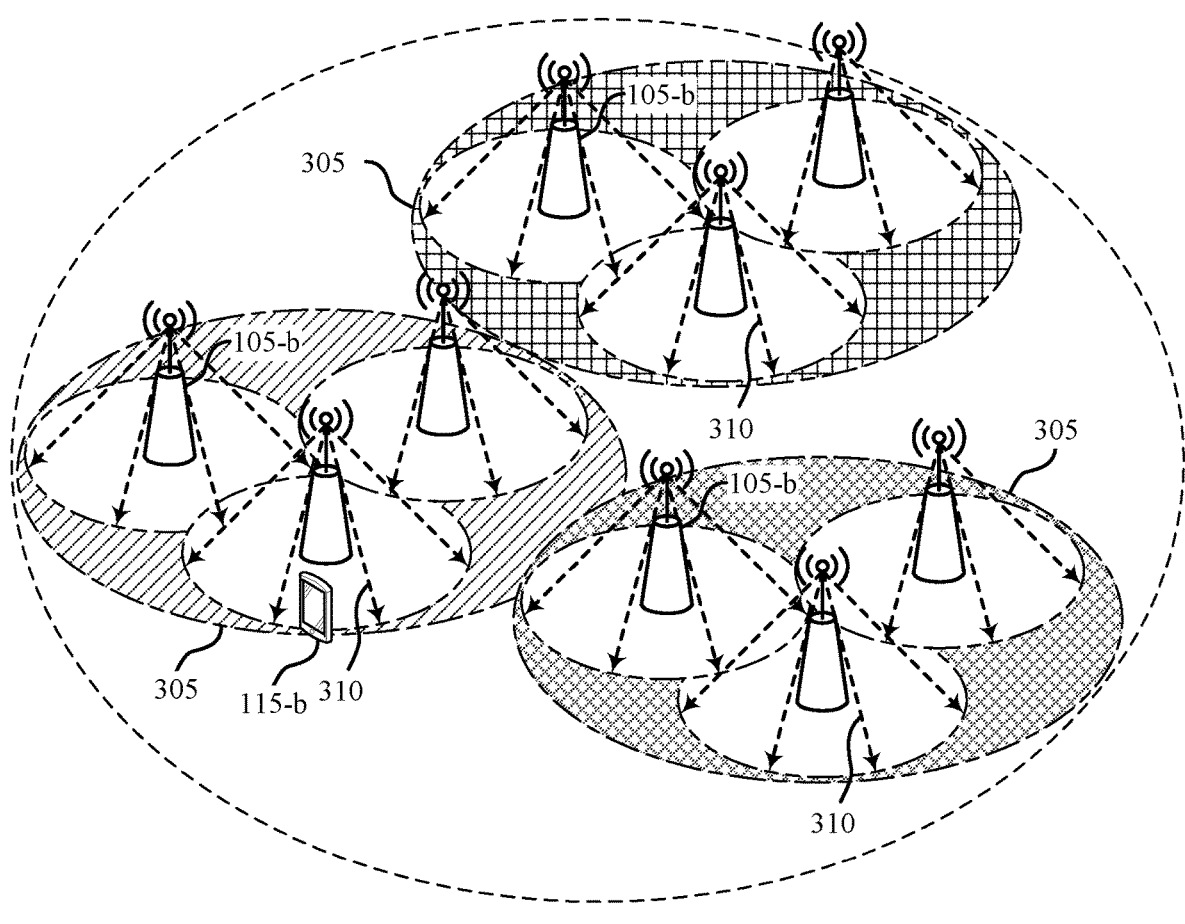
FIG. 3 illustrates an example of a wireless communication system that supports hierarchical mobility in accordance with aspects of the present disclosure.

FIG. 3 illustrates an example of a wireless communication system 300 that supports hierarchical mobility in accordance with aspects of the present disclosure. In some examples, the wireless communication system 300 may implement aspects of wireless communications systems 100 and 200. The wireless communication system 300 may include one or more base stations 105-*b* and one or more UEs 115-*b*. The base stations 105-*b* may be examples of the base stations 105 described with reference to FIGS. 1 and 2. The UE 115-*b* may be an example of the UEs 115 described with reference to FIGS. 1 and 2.

The wireless communication system 300 may illustrate hierarchical mobility procedures where the communication resources used to communicate network signals 310 (e.g., synchronization signals, or paging signals, or both) are defined on the basis of RAN-AC 305. When the UE 115-*b* is operating in the RRC inactive state or the RRC idle state, the UE 115-*b* may be configured to monitor for synchronization signals, or paging signals, or both transmitted by the base station 105-*b*. In the wireless communication system 300, a network used to communicate these signals may be defined for each RAN-AC. In some cases, the networks defined for the RAN-ACs may be configured such that neighboring RAN-ACs may not use the same communication resources as part of their networks. In the examples of the wireless communication system 300 the network area associated with a network may be a RAN-AC 305.

In some wireless communication systems, multi-beam synchronization signals or multi-beam paging signals or both may be transmitted over a wide area to reach an intended UE 115-*b*. In the wireless communication system 300, which uses hierarchical mobility, networks may be used to transmit the multi-beam synchronization signals or the multi-beam paging signals or both. The networks, however, may be defined on a RAN-AC-by-RAN-AC basis. In this manner, the amount of communication resources used to communicate synchronization signals or paging signals, among other examples, between the base station 105-*b* and the UE 115-*b* may be reduced.

The network may identify communication resources (e.g., frequency-based resources or time-based resources) of a network used for communicating synchronization signals, or paging signals, or both in a network area (e.g., RAN-AC 305, an SFN area, etc.). In the wireless communication system 300, the network area may be a RAN-AC 305. In some examples, different communication resources may be used to communicate synchronization signals, or paging signals, or both in neighboring RAN-ACs 305 (e.g., network areas, SFN areas, etc.). In such examples, RAN-ACs 305 (e.g., network areas, SFN areas, etc.) near each other may use different communication resources so they do not interfere with one another.

The network may transmit an indication of the network areas or the communication resources to the UE 115-*b*. In some cases, the base station 105-*b* may transmit an RRC message that includes the indication. The indication may include a listing of RAN-ACs associated with the UE 115-*b*, identifiers for the RAN-ACs associated with the UE 115-*b*, the communication resources to be used in each RAN-AC 305 to transmit synchronization signals, or paging signals, or both, or a combination thereof. In some cases, the allocation of resources to each RAN-AC 305 (e.g., network area, SFN area, etc.) may be done dynamically by the network based on network conditions in a location. In other cases, the allocation of resources to each RAN-AC 305 (e.g., network area, SFN area, etc.) may be done a static basis or a semi-static basis. For example, the communication resources assigned to a RAN-AC 305 may be identifiable based on the identifier of the RAN-AC 305.

The UE 115-*b* may identify the RAN-AC 305 (e.g., network area, SFN area, etc.) in which it is operating. The UE 115-*b* may also identify the communication resources (e.g., frequency resources) allocated to the identified RAN-AC 305 for communicating synchronization signals, or paging signals, or both. The UE 115-*b* may monitor for synchronization signals, or paging signals, or both based on the RAN-AC 305 (e.g., network area, SFN area, etc.) in which it is operating and based on the communication resources associated with that RAN-AC 305 (e.g., network area, SFN area, etc.).

When the UE 115-*b* moves from a first RAN-AC 305 to a second RAN-AC 305, the UE 115-*b* may perform procedures to monitor a second set of communication resources for synchronization signals, or paging signals, or both in the second RAN-AC 305. The second set of communication resources may be different than the first set of communication resources used with the first RAN-AC 305. In some cases, the UE 115-*b* may identify the communication resources based on the identifiers for the RAN-ACs 305.

The RAN-AC 305 may be used as the network area in hierarchical mobility when the UE 115-*b* is operating in the RRC inactive state or the RRC idle state. The UE 115-*b* may identify that it is operating in the RRC inactive state or the RRC idle state before monitoring for the synchronization signals or the paging signals or both.

Figure 4:
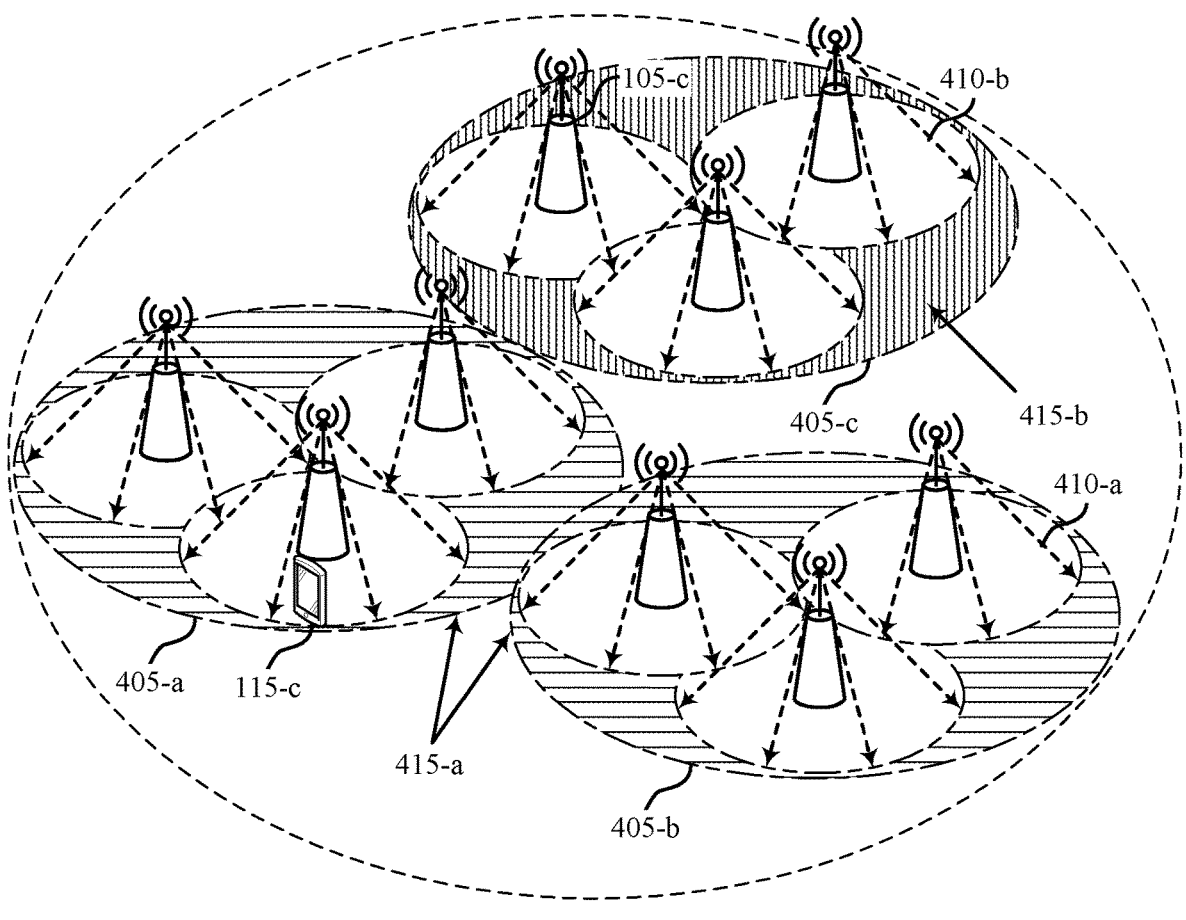
FIG. 4 illustrates an example of a wireless communication system that supports hierarchical mobility in accordance with aspects of the present disclosure.

FIG. 4 illustrates an example of a wireless communication system 400 that supports hierarchical mobility in accordance with aspects of the present disclosure. In some examples, the wireless communication system 400 may implement aspects of wireless communication system 100. The wireless communication system 400 may include one or more base stations 105-*c* and one or more UEs 115-*c*. The base stations 105-*c* may be examples of the base stations 105 described with reference to FIGS. 1 and 2. The UE 115-*c* may be an example of the UEs 115 described with reference to FIGS. 1 and 2.

The wireless communication system 400 may illustrate hierarchical mobility procedures where the communication resources used to communicate network signals 410 (e.g., synchronization signals, or paging signals, or both) are defined on the basis of RNA 415. When the UE 115-*c* is operating in the RRC inactive state, the UE 115-*c* may be configured to monitor for synchronization signals, or paging signals, or both (among other signals) transmitted by the base station 105-*c*. In the wireless communication system 400, a network used to communicate these signals may be defined for each RNA 415. In some cases, the networks defined for the RNA 415 may be configured such that neighboring RNAs (e.g., first RNA 415-*a* and second RNA 415-*b*) may not use the same communication resources as part of their networks. In the examples of the wireless communication system 400 the network area associated with a network may be an RNA 415. An RNA 415 may include one or more RAN-ACs 405. For example, the first RNA 415-*a* may include at least a first RAN-AC 405-*a* and a second RAN-AC 405-*b*, and the second RNA 415-*b* may include a single RAN-AC, a third RAN-AC 405-*c*.

In some wireless communication systems, multi-beam synchronization signals, or multi-beam paging signals, or both may be transmitted over a wide area to reach an intended UE 115-*c*. In the wireless communication system 400, which uses hierarchical mobility, networks may be used to transmit the multi-beam synchronization signals or the multi-beam paging signals or both. The networks, however, may be defined on an RNA-by-RNA basis. In this manner, the amount of communication resources used to communicate synchronization signals or paging signals between the base station 105-*c* and the UE 115-*c* may be reduced.

The network may identify communication resources (e.g., frequency-based resources or time-based resources) of a network used for communicating synchronization signals, or paging signals, or both in a network area (e.g., RNA 415, an SFN area, etc.). In the wireless communication system 400, the network area may be an RNA 415. In some examples, different communication resources may be used to communicate synchronization signals, or paging signals, or both in neighboring RNAs 415 (e.g., network areas, SFN areas, etc.). In such examples, RNA 415 (e.g., network areas, SFN areas, etc.) near each other may use different communication resources so they do not interfere with one another. In some cases, the UE 115-*c* may assist the network in defining the RNA 415 to be used while the UE 115-*c* is in the RRC inactive state. For example, if the UE 115-*c* is traveling at a high-rate of speed, the RNA 415 may be configured as larger than if the UE 115-*c* is traveling at a lower-rate of speed.

The network may transmit an indication of the network areas or the communication resources to the UE 115-*c*. In some cases, the base station 105-*c* may transmit an RRC message that includes the indication. The indication may include an identifier of the RNA 415, a listing of RAN-ACs associated with the UE 115-*c* or associated with the RNA 415, identifiers for the RAN-ACs associated with the UE 115-*c*, the communication resources to be used in each RAN-AC 405 to transmit synchronization signals, or paging signals, or both, or a combination thereof. In some cases, the allocation of resources to each RNA 415 (e.g., network area, SFN area, etc.) may be done dynamically by the network based on network conditions in a location. In other cases, the allocation of resources to each RNA 415 (e.g., network area, SFN area, etc.) may be done a static basis or a semi-static basis. For example, the communication resources assigned to an RNA 415 may be identifiable based on the identifier of the RNA 415.

The UE 115-*c* may identify the RNA 415 (e.g., network area, SFN area, etc.) in which it is operating. The UE 115-*c* may also identify the communication resources (e.g., frequency resources) allocated to the identified RNA 415 for communicating synchronization signals, or paging signals, or both. The UE 115-*c* may monitor for synchronization signals, or paging signals, or both based on the RNA 415 (e.g., network area, SFN area, etc.) in which it is operating and based on the communication resources associated with that RNA 415 (e.g., network area, SFN area, etc.).

When the UE 115-*c* moves from a first RNA 415-*a* to a second RNA 415-*b*, the UE 115-*c* may perform procedures to monitor a second set of communication resources for synchronization signals, or paging signals, or both in the second RNA 415-*b*. The second set of communication resources may be different than the first set of communication resources used with the first RNA 415-*a*. In some cases, the UE 115-*c* may identify the communication resources based on the identifiers for the RNAs 415.

The RNA 415 may be used as the network area in hierarchical mobility when the UE 115-*c* is operating in the RRC inactive state. The UE 115-*c* may identify that it is operating in the RRC inactive state before monitoring for the synchronization signals or the paging signals or both.

Figure 5:
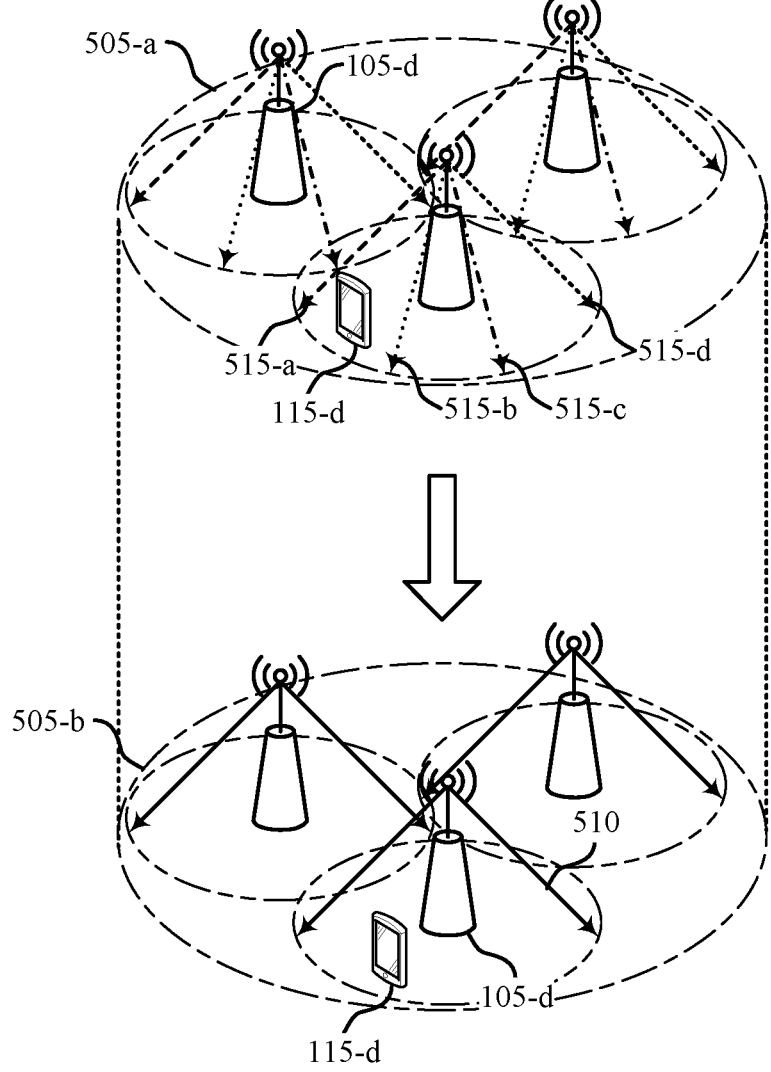
FIG. 5 illustrates an example of a wireless communication system that supports hierarchical mobility in accordance with aspects of the present disclosure.

FIG. 5 illustrates an example of a wireless communication system 500 that supports hierarchical mobility in accordance with aspects of the present disclosure. In some examples, the wireless communication system 500 may implement aspects of wireless communication system 100. The wireless communication system 500 may include one or more base stations 105-*d* and one or more UEs 115-*d*. The base stations 105-*d* may be examples of the base stations 105 described with reference to FIGS. 1 and 2. The UE 115-*d* may be an example of the UEs 115 described with reference to FIGS. 1 and 2.

The wireless communication system 500 illustrates two different configurations. In a first TA 505-*a*, multi-beam signaling for synchronization signals, or paging signals, or both is shown. In a second TA 505-*b*, network signaling for synchronization signals, or paging signals, or both is shown.

The wireless communication system 500 may illustrate hierarchical mobility procedures where the communication resources used to communicate network signals 510 (e.g., synchronization signals, or paging signals, or both) are defined on the basis of a TA 505. When the UE 115-*d* is operating in the RRC idle state, the UE 115-*d* may be configured to monitor for synchronization signals, or paging signals, or both transmitted by the base station 105-d. In the wireless communication system 500, a network used to communicate these signals may be defined for each TA 505. In some cases, the networks defined for the TA 505 may be configured such that neighboring TA 505 may not use the same communication resources as part of their networks. In the examples of the wireless communication system 500 the network area associated with a network may be a TA 505. A TA 505 may include one or more RNAs, one or more RAN-ACs, or one or more cells.

In the first TA 505-a, multi-beam synchronization signals or multi-beam paging signals or both may be transmitted over a wide area to reach an intended UE 115-d. For example, a base station 105-d may transmit a single paging message using a plurality of beams (e.g., beams 515-a, 515-b, 515-c, or 515-d) in a beam-sweeping pattern. In the wireless communication system 500, which uses hierarchical mobility, networks may be used to transmit the multi-beam synchronization signals or the multi-beam paging signals or both. The networks, however, may be defined on a TA-by-TA basis. In this manner, the amount of communication resources used to communicate synchronization signals or paging signals between the base station 105-d and the UE 115-d may be reduced.

The network may identify communication resources (e.g., frequency-based resources or time-based resources) of a network used for communicating synchronization signals, or paging signals, or both in a network area (e.g., TA 505, an SFN area, etc.). In the wireless communication system 400, the network area may be an TA 505. In some examples, different communication resources may be used to communicate synchronization signals, or paging signals, or both in neighboring TAs 505 (e.g., network areas, SFN areas, etc.). In such examples, TAs 505 (e.g., network areas, SFN areas, etc.) near each other may use different communication resources so they do not interfere with one another.

The network may transmit an indication of the network areas or the communication resources to the UE 115-d. In some cases, the base station 105-d may transmit an RRC message that includes the indication. The indication may include an identifier of the TA 505, a listing of RAN-ACs associated with the UE 115-d or associated with the TA 505, identifiers for the RAN-ACs associated with the UE 115-d, the communication resources to be used in each RAN-AC 405 to transmit synchronization signals, or paging signals, or both, or a combination thereof. In some cases, the allocation of resources to each TA 505 (e.g., network area, SFN area, etc.) may be done dynamically by the network based on network conditions in a location. In other cases, the allocation of resources to each TA 505 (e.g., network area) may be done a static basis or a semi-static basis. For example, the communication resources assigned to an TA 505 may be identifiable based on the identifier of the TA 505.

The UE 115-d may identify the TA 505 (e.g., network area, SFN area, etc.) in which it is operating. The UE 115-d may also identify the communication resources (e.g., frequency resources) allocated to the identified TA 505 for communicating synchronization signals, or paging signals, or both. The UE 115-d may monitor for synchronization signals, or paging signals, or both based on the TA 505 (e.g., network area, SFN area, etc.) in which it is operating and based on the communication resources associated with that TA 505 (e.g., network area, SFN area, etc.).

When the UE 115-d moves from a first TA 505 to a second TA 505, the UE 115-d may perform procedures to monitor a second set of communication resources for synchronization signals, or paging signals, or both in the second TA 505.

The second set of communication resources may be different than the first set of communication resources used with the first TA 505. In some cases, the UE 115-d may identify the communication resources based on the identifiers for the TA 505.

The TA 505 may be used as the network area in hierarchical mobility when the UE 115-d is operating in the RRC inactive state. The UE 115-d may identify that it is operating in the RRC inactive state before monitoring for the synchronization signals or the paging signals or both.

Figure 6:
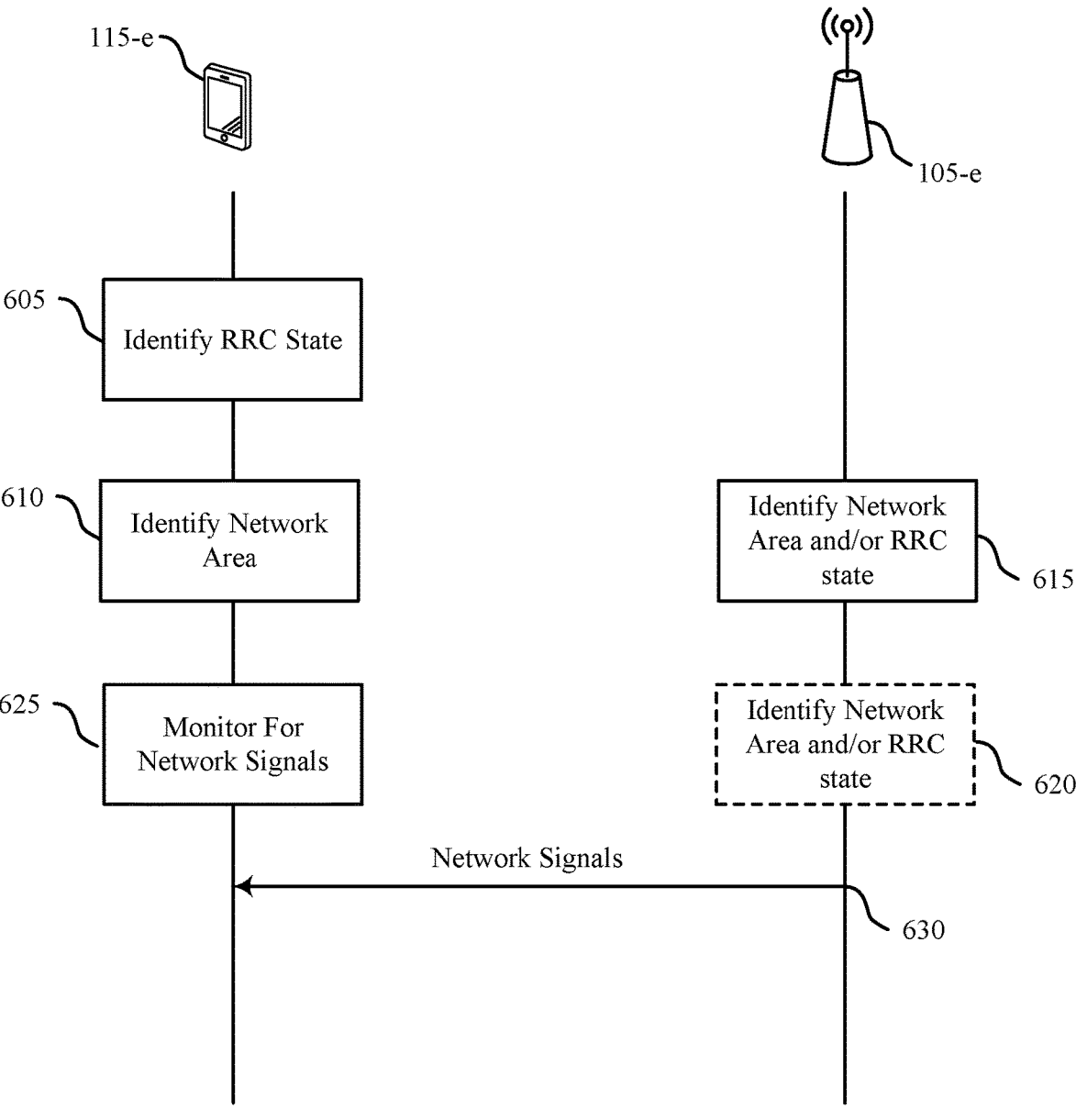
FIG. 6 illustrates an example of a process flow that supports hierarchical mobility in accordance with aspects of the present disclosure.

FIG. 6 illustrates an example of a process flow 600 that supports hierarchical mobility in accordance with aspects of the present disclosure. In some examples, the process flow 600 may implement aspects of wireless communication system 100. The process flow 600 illustrates functions of communications between a base station 105-e and a UE 115-e. The base station 105-e may be examples of the base stations 105 described with reference to FIGS. 1 through 5. The UE 115-e may be an example of the UEs 115 described with reference to FIGS. 1 through 5.

At 605, UE 115-e may identify an RRC state of UE 115-e from a set of states that include the RRC inactive state, the RRC idle state, and the RRC connected state. In some examples, UE 115-e may identify that UE 115-e is operating in the RRC inactive state. In some examples, UE 115-e may identify that UE 115-e is operating in the RRC idle state. In some examples, the UE 115-e may enter one of the RRC states and identifying the state may be based on the entering the RRC state. Said another way, the UE 115-c may identify its RRC state at a transition of RRC states.

At 610, UE 115-e may identify a network area for communicating one or more network SSs or one or more network paging signals associated with the network area based on the RRC state of UE 115-e. In some examples, identifying the network area may include identifying an SFN area for communicating the one or more network SSs or the one or more network paging signals. In some examples, the one or more network SSs or the one or more network paging signals may be associated with the SFN area. In some examples, UE 115-e may identify, based on UE 115-e operating in the RRC inactive state or the RRC idle state, a RAN-AC defined by the network as the network area. In some examples, the one or more network SSs or the one or more network paging signals may be associated with the RAN-AC. In some examples, UE 115-e may identify, based on UE 115-e operating in the RRC inactive state, an RNA defined by UE 115-e as the network area. In some examples, the one or more network SSs or the one or more network paging signals may be associated with the RNA. In some examples, the RNA may include a plurality of RAN-ACs. In some examples, UE 115-e may identify, based on UE 115-e operation in the RRC idle state, a TA defined by the network as the network area. In some examples, the one or more network SSs or the one or more network paging signals may be associated with the TA. In some examples, the one or more network SSs or the one or more network paging signals may include a single-beam signal communicated over a mmW network.

At 615, base station 105-e (e.g., a network device) may identify the network area associated with UE 115-e operating in the RRC inactive or the RRC idle state. In some examples, base station 105-e may establish an RRC connection with UE 115-e. In some examples, base station 105-e may identify that UE 115-e enters the RRC inactive state or the RRC idle state or the RRC connected state based on signaling exchanged as part of the RRC connection.

At 620, in some examples, base station 105-*e* may identify data to be communicated with UE 115-*e*. The base station 105-*e* may identify the data to be communicated with UE 115-*e* based on identifying that UE 115-*e* enters the RRC inactive state or the RRC idle state. In some examples, base station 105-*e* may identify the network area based on receiving an indication of the RNA established by the UE. In some examples, base station 105-*e* may identify, based on the network area, communication resources assigned for the one or more network SSs or the one or more network paging signals different than communication resources of neighboring network areas.

At 625, UE 115-*e* may monitor for the one or more network SSs or the one or more network paging signals associated with the network area based on identifying the network area. In some examples, UE 115-*e* may monitor for the one or more network SSs or the one or more network paging signals based on identifying one or more characteristics common to the one or more network SSs or the one or more network paging signals.

At 630, base station 105-*e* may transmit, based on the network area, the one or more network SSs or the one or more network paging signals within the network area. In some examples, base station 105-*e* may transmit the one or more network SSs or the one or more network paging signals based on identifying the communication resources. In some examples, UE 115-*e* may receive the one or more network SSs or the one or more network paging signals associated with the network area based on monitoring for the one or more network SSs or the one or more network paging signals. In some examples, UE 115-*e* may receive a network paging message based on monitoring for the one or more network SSs or the one or more network paging signals, and UE 115-*e* may enter an RRC connected state based on receiving the network paging message. Base station 105-*e* may identify that UE 115-*e* is operating in the RRC connected state based on transmitting the one or more network SSs or the one or more network paging signals within the network area, and transmit the data to be communicated to UE 115-*e*.

Figure 7:
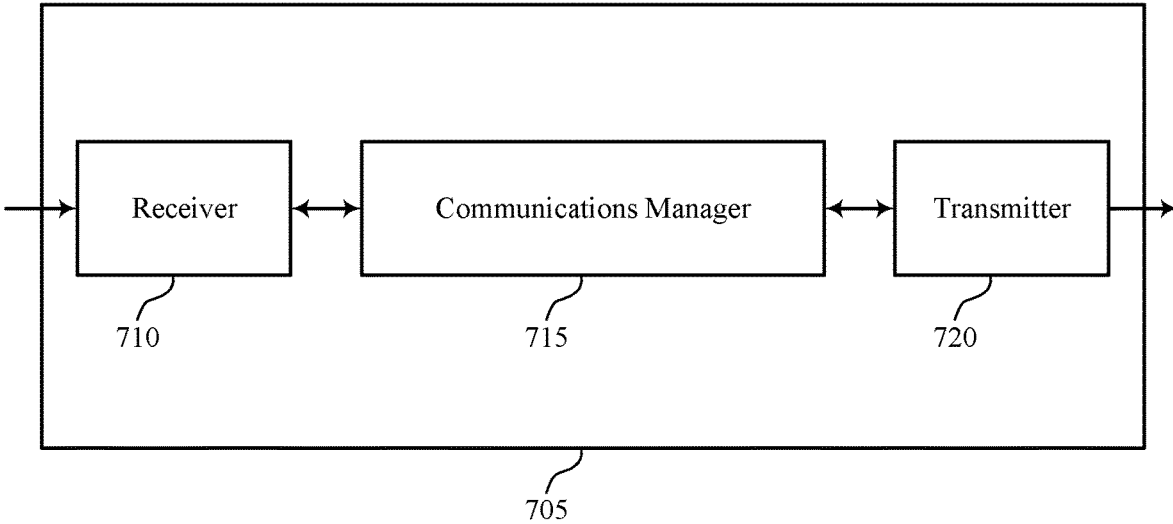
FIGS. 7 and 8 show block diagrams of devices that support hierarchical mobility in accordance with aspects of the present disclosure.

FIG. 7 shows a block diagram 700 of a device 705 that supports hierarchical mobility in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to hierarchical mobility, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a radio resource control state of a user equipment from a set of states that includes a radio resource control inactive state and a radio resource control idle state, identify a network area for communicating one or more network synchronization signals or one or more network paging signals associated with the network area based on the radio resource control state of the user equipment, and monitor, by the user equipment, for the one or more network synchronization signals or the one or more network paging signals associated with the network area based on identifying the network area.

The communications manager 715 as described herein may be implemented to realize one or more potential advantages. One implementation may allow the device 705 to reduce paging inefficiencies and power consumption and increase battery life by communicating with a base station 105 (as shown in FIG. 1) more efficiently. For example, the device 705 may monitor network synchronization and paging signals while operating in an RRC inactive state or RRC idle state to save power and reduce processing time. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
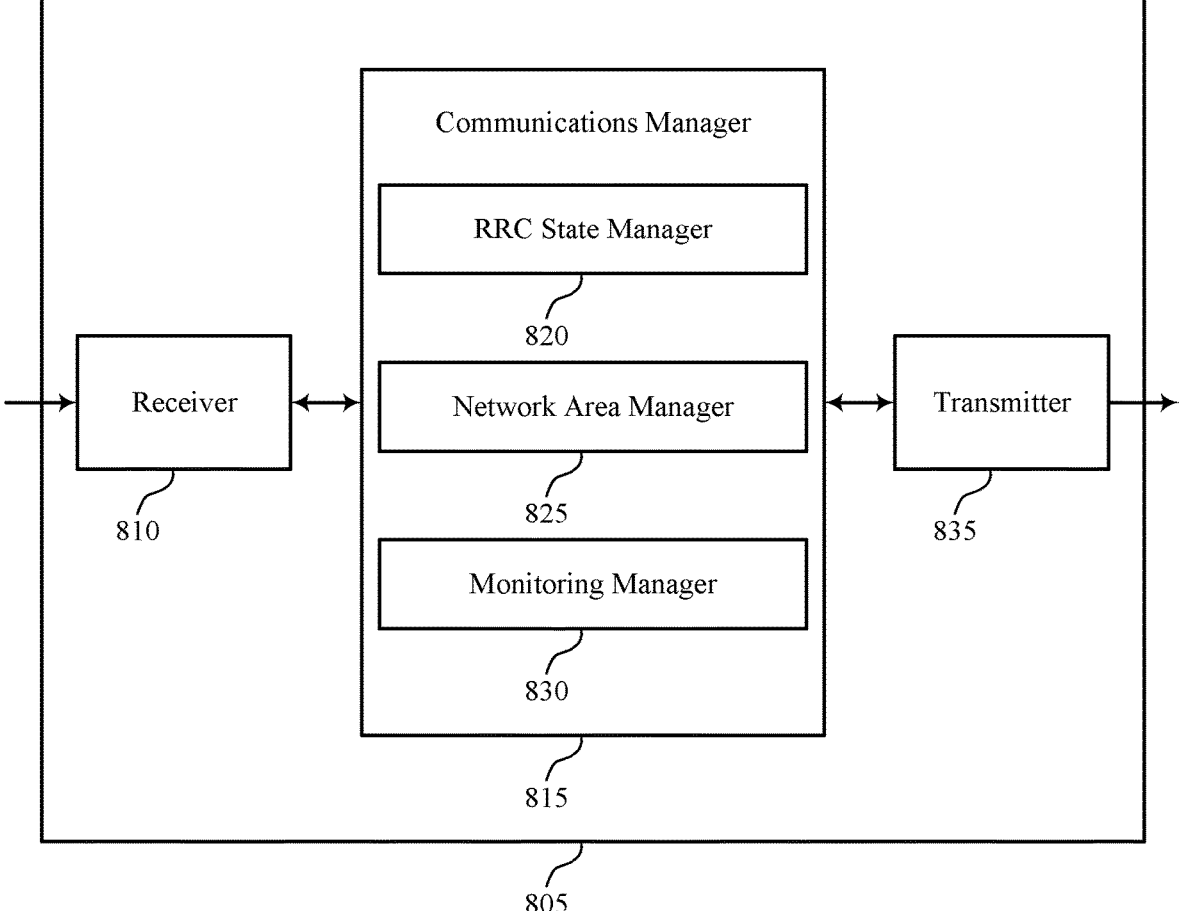

FIG. 8 shows a block diagram 800 of a device 805 that supports hierarchical mobility in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to hierarchical mobility, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an RRC state manager 820, a network area manager 825, and a monitoring manager 830. The communications manager 815 may be an example of aspects of the communications manager 1010 described herein.

The RRC state manager 820 may identify a radio resource control state of a user equipment from a set of states that includes a radio resource control inactive state and a radio resource control idle state.

The network area manager 825 may identify a network area for communicating one or more network synchronization signals or one or more network paging signals associated with the network area based on the radio resource control state of the user equipment.

The monitoring manager 830 may monitor, by the user equipment, for the one or more network synchronization signals or the one or more network paging signals associated with the network area based on identifying the network area.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
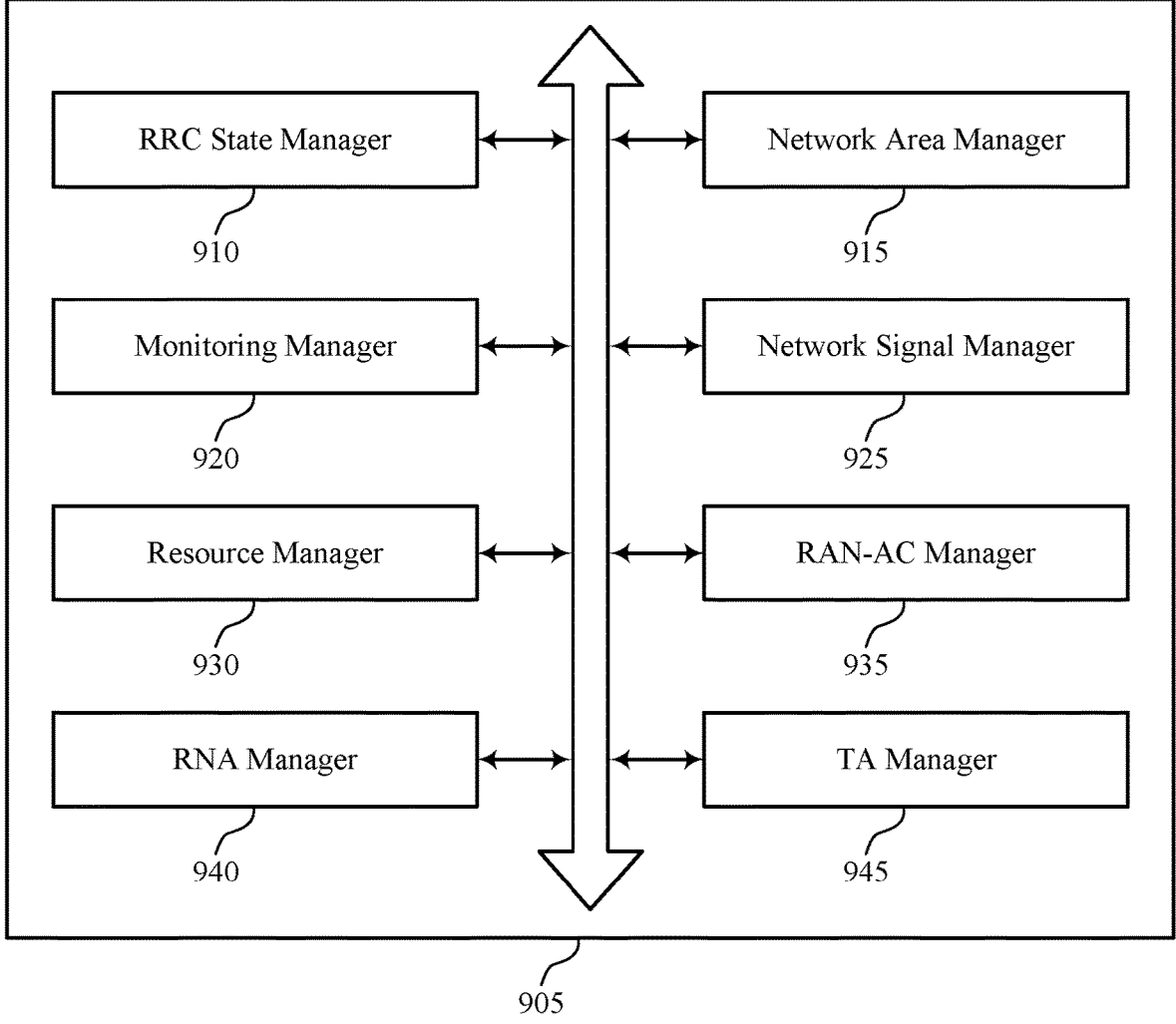
FIG. 9 shows a block diagram of a communications manager that supports hierarchical mobility in accordance with aspects of the present disclosure.

FIG. 9 shows a block diagram 900 of a communications manager 905 that supports hierarchical mobility in accordance with aspects of the present disclosure. The communications manager 905 may be an example of aspects of a communications manager 715, a communications manager 815, or a communications manager 1010 described herein. The communications manager 905 may include an RRC state manager 910, a network area manager 915, a monitoring manager 920, a network signal manager 925, a resource manager 930, a RAN-AC manager 935, an RNA manager 940, and a TA manager 945. Each of these modules may communicate, directly or indirectly, with one another (e.g., via one or more buses).

The RRC state manager 910 may identify a radio resource control state of a user equipment from a set of states that includes a radio resource control inactive state and a radio resource control idle state. In some examples, the RRC state manager 910 may enter a radio resource control connected state based on receiving the network paging message. In some examples, the RRC state manager 910 may enter, by the user equipment, the radio resource control inactive state or the radio resource control idle state.

The network area manager 915 may identify a network area for communicating one or more network synchronization signals or one or more network paging signals associated with the network area based on the radio resource control state of the user equipment. In some cases, identifying the network area may include identifying an SFN area for communicating the one or more network synchronization signals or the one or more network paging signals, where the one or more network synchronization signals or the one or more network paging signals may be associated with the SFN area.

The monitoring manager 920 may monitor, by the user equipment, for the one or more network synchronization signals or the one or more network paging signals associated with the network area based on identifying the network area.

The network signal manager 925 may receive, by the user equipment, the one or more network synchronization signals or the one or more network paging signals associated with the network area based on monitoring for the one or more network synchronization signals or the one or more network paging signals. In some examples, the network signal manager 925 may receive a network paging message based on monitoring for the one or more network synchronization signals or the one or more network paging signals associated with the network area. In some cases, the one or more network synchronization signals or the one or more network paging signals include a single-beam signal communicated over a millimeter wave network.

The resource manager 930 may identify one or more characteristics common to the one or more network synchronization signals or the one or more network paging signals communicated within the network area, where monitoring for the one or more network synchronization signals or the one or more network paging signals is based on identifying the one or more characteristics common to the one or more network synchronization signals or the one or more network paging signals.

The RAN-AC manager 935 may identify, based on the user equipment operating in the radio resource control inactive state or the radio resource idle state, a radio access network area code defined by a network, where the one or more network synchronization signals or the one or more network paging signals are associated with the radio access network area code. In some examples, the RAN-AC manager 935 may identify that the user equipment is operating in the radio resource control inactive state, where identifying the radio access network area code is based on identifying that the user equipment is operating in the radio resource control inactive state.

The RNA manager 940 may identify, based on the user equipment operating in the radio resource control inactive state, a radio access network based notification area defined by the user equipment, where the one or more network synchronization signals or the one or more network paging signals are associated with the radio access network based notification area. In some examples, the RNA manager 940 may identify that the user equipment is operating in the radio resource control inactive state, where identifying the radio access network based notification area is based on identifying that the user equipment is operating in the radio resource control inactive state. In some cases, the radio access network based notification area includes a set of radio access network area codes.

The TA manager 945 may identify, based on the user equipment operating in the radio resource control idle state, a tracking area defined by a network, where the one or more network synchronization signals or the one or more network paging signals are associated with the tracking area. In some examples, the TA manager 945 may identify that the user equipment is operating in the radio resource control idle state, where identifying the tracking area is based on identifying that the user equipment is operating in the radio resource control idle state.

Figure 10:
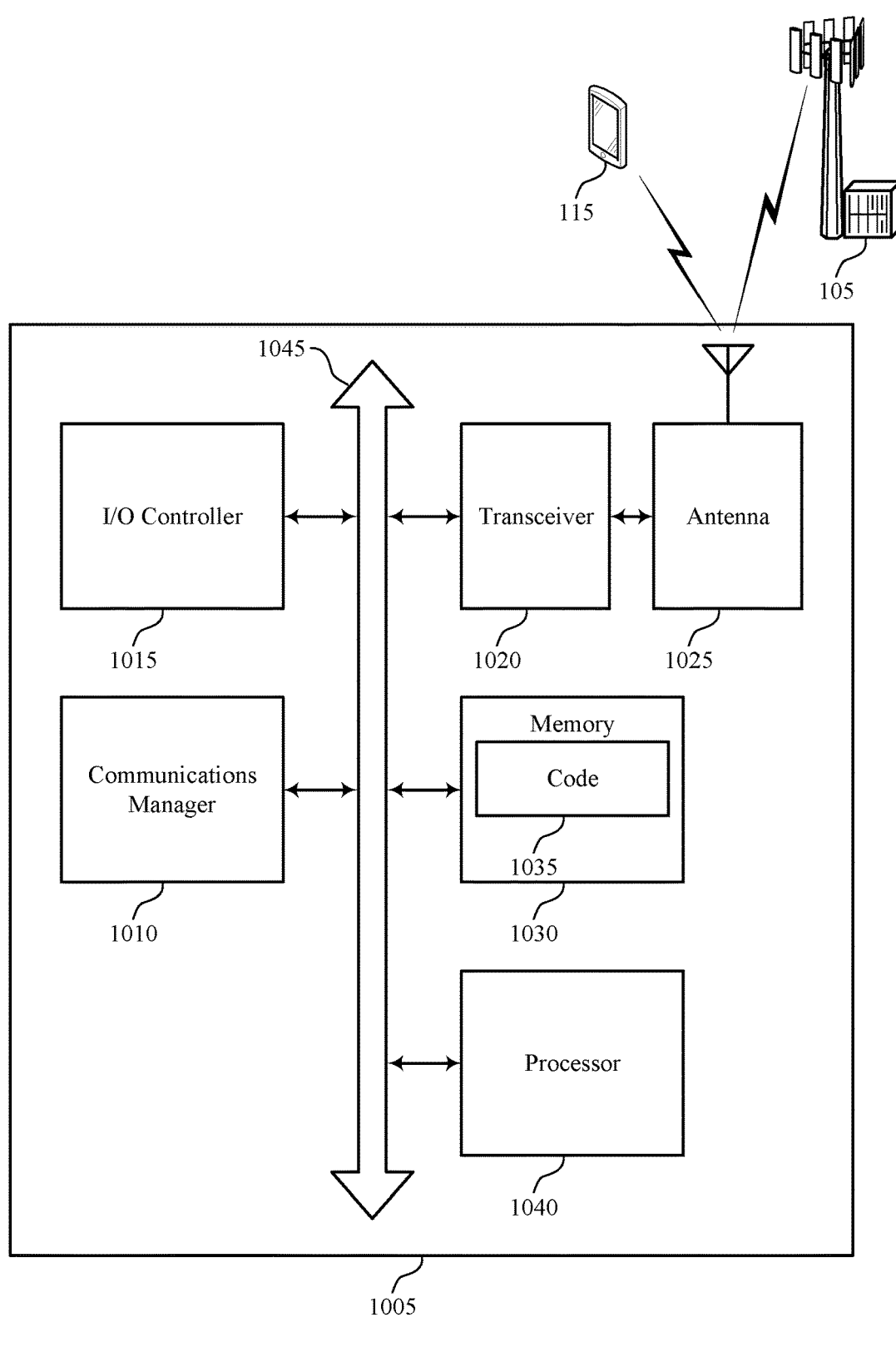
FIG. 10 shows a diagram of a system including a device that supports hierarchical mobility in accordance with aspects of the present disclosure.

FIG. 10 shows a diagram of a system 1000 including a device 1005 that supports hierarchical mobility in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a radio resource control state of a user equipment from a set of states that includes a radio resource control inactive state and a radio resource control idle state, identify a network area for communicating one or more network synchronization signals or one or more network paging signals associated with the network area based on the radio resource control state of the user equipment, and monitor, by the user equipment, for the one or more network synchronization signals or the one or more network paging signals associated with the network area based on identifying the network area.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting hierarchical mobility).

The processor 1040 of the device 1005 (e.g., controlling the receiver 710, the transmitter 720, or the transceiver 1020) may reduce power consumption and increase communication efficiency based on monitoring synchronization signals. In some examples, the processor 1040 of device 1005 may execute the instructions stored in the memory 1030 and cause the device 1005 to efficiently communicate with a base station 105 by reducing processing time, paging inefficiencies, and power consumption based on monitoring synchronization and paging signals while operating in an RRC inactive state or an RRC idle state. The improvements in power saving and data processing efficiency may further increase battery life at the device 1005.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

FIG. 11 shows a block diagram 1100 of a device 1105 that supports hierarchical mobility in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to hierarchical mobility, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a network area associated with a user equipment operating in a radio resource control inactive state or a radio resource control idle state and transmit one or more network synchronization signals or one or more network paging signals within the network area based on the network area.

The communications manager 1115 as described herein may be implemented to realize one or more potential advantages. One implementation may allow device 1105 to save power by communicating with a UE 115 (as shown in FIG. 1) more efficiently. For example, the device 1105 may reduce paging overhead time based on the network synchronization signals. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
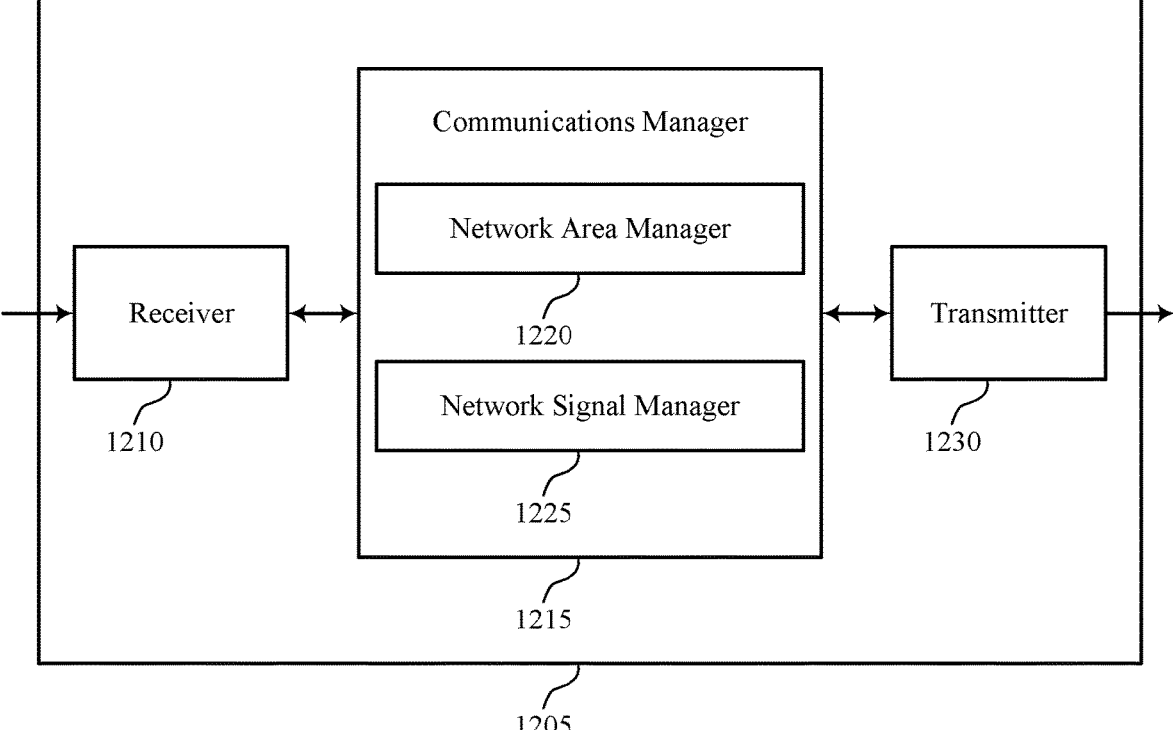

FIG. 12 shows a block diagram 1200 of a device 1205 that supports hierarchical mobility in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to hierarchical mobility, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a network area manager 1220 and a network signal manager 1225. The communications manager 1215 may be an example of aspects of the communications manager 1410 described herein.

The network area manager 1220 may identify a network area associated with a user equipment operating in a radio resource control inactive state or a radio resource control idle state.

The network signal manager 1225 may transmit, by a base station, one or more network synchronization signals or one or more network paging signals within the network area based on the network area.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
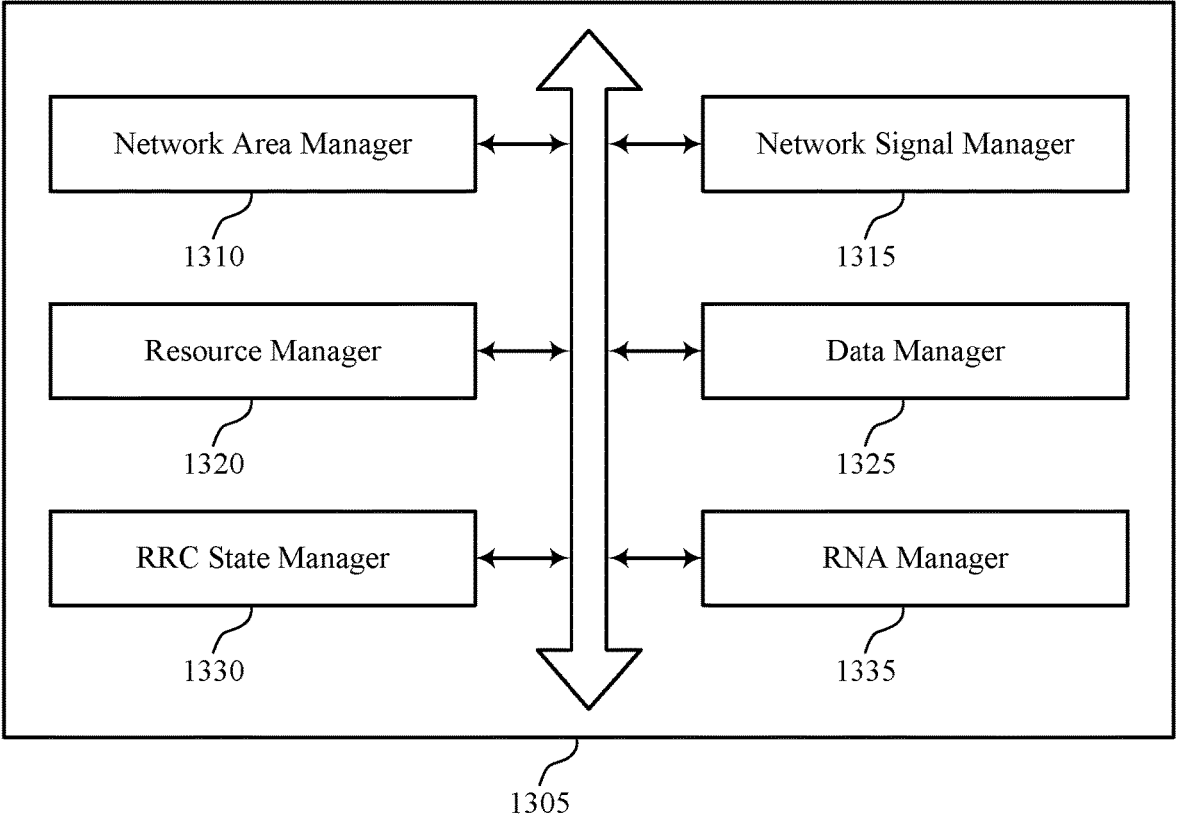
FIG. 13 shows a block diagram of a communications manager that supports hierarchical mobility in accordance with aspects of the present disclosure.

FIG. 13 shows a block diagram 1300 of a communications manager 1305 that supports hierarchical mobility in accordance with aspects of the present disclosure. The communications manager 1305 may be an example of aspects of a communications manager 1115, a communications manager 1215, or a communications manager 1410 described herein. The communications manager 1305 may include a network area manager 1310, a network signal manager 1315, a resource manager 1320, a data manager 1325, an RRC state manager 1330, and an RNA manager 1335. Each of these modules may communicate, directly or indirectly, with one another (e.g., via one or more buses).

The network area manager 1310 may identify a network area associated with a user equipment operating in a radio resource control inactive state or a radio resource control idle state. In some examples, the network area manager 1310 may identify the network area associated with the user equipment and associated with a radio resource control state of the user equipment based on identifying the data, where transmitting the one or more network paging signals is based on identifying the network area associated with the user equipment. In some cases, identifying the network area may include identifying an SFN area associated with the user equipment.

In some cases, the network area is a radio access network area code defined by a network. In some cases, the network area is a radio access network based notification area established by the user equipment. In some cases, the network area is a tracking area.

The network signal manager 1315 may transmit, by a base station, one or more network synchronization signals or one or more network paging signals within the network area based on the network area. In some cases, the one or more network synchronization signals or the one or more network paging signals include a single-beam signal communicated over a millimeter wave network.

The resource manager 1320 may identify, based on the network area, communication resources assigned for the one or more network synchronization signals or the one or more network paging signals different than communication resources of neighboring network areas, where transmitting the one or more network synchronization signals or the one or more network paging signals within the network area is based on identifying the communication resources.

The data manager 1325 may identify data to be communicated with the user equipment operating in the radio resource control inactive state or the radio resource control idle state. In some examples, the data manager 1325 may transmit the data to be communicated to the user equipment based on identifying that the user equipment is operating in the radio resource control connected state.

The RRC state manager 1330 may establish a radio resource control connection with the user equipment. In some examples, the RRC state manager 1330 may identify that the user equipment enters the radio resource control inactive state or the radio resource control idle state based on establishing the radio resource control connection, where identifying the data to be communicated with the user equipment is based on identifying that the user equipment enters the radio resource control inactive state or the radio resource control idle state.

In some examples, the RRC state manager 1330 may identify that the user equipment is operating in a radio resource control connected state based on transmitting the one or more network synchronization signals or the one or more network paging signals within the network area. In some cases, the user equipment operates in the radio resource control inactive state. In some cases, the user equipment operates in the radio resource control idle state.

The RNA manager 1335 may receive an indication of a radio access network based notification area established by the user equipment, where identifying the network area is based on the indication of the radio access network based notification area received from the user equipment.

Figure 14:
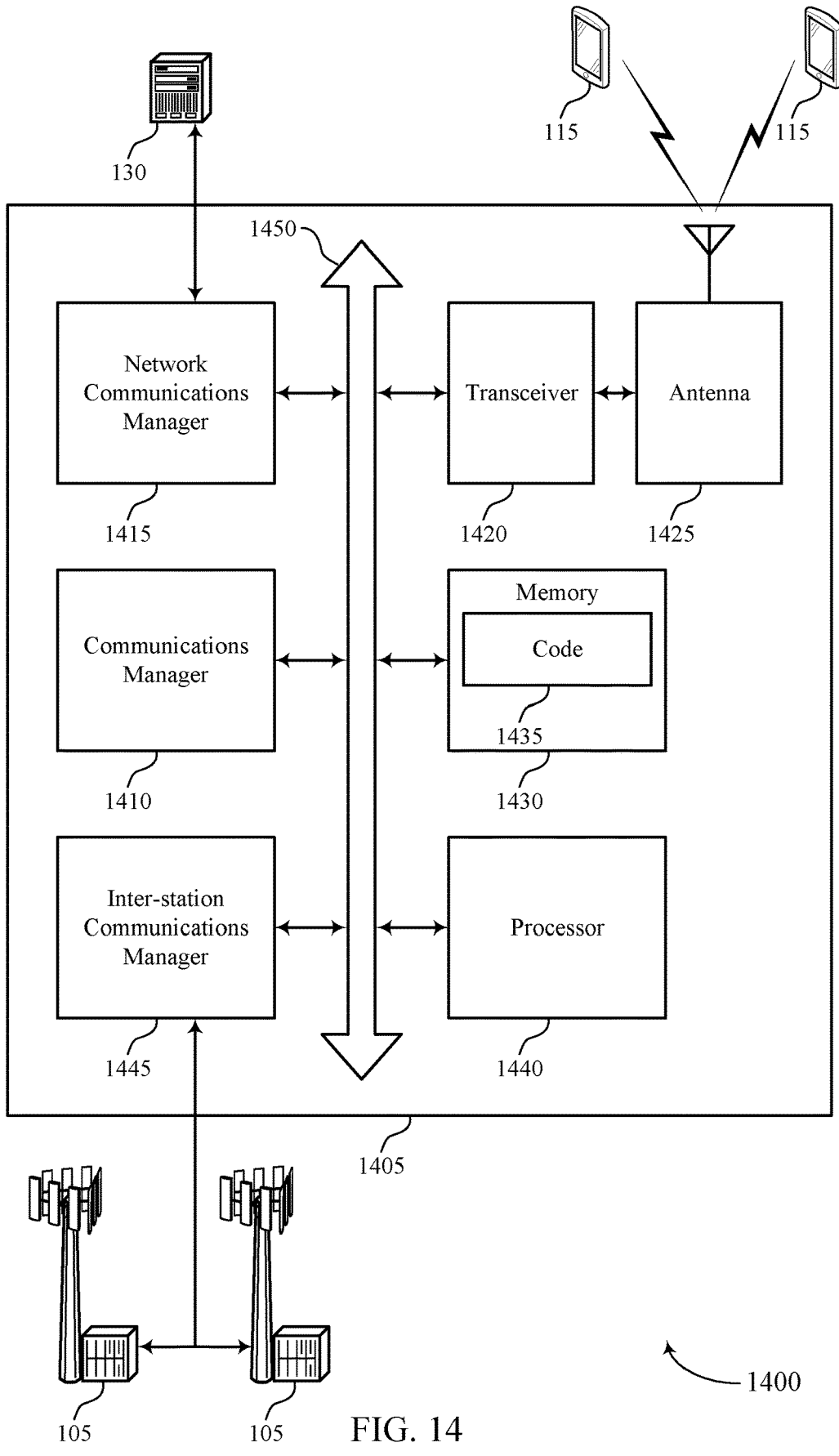
FIG. 14 shows a diagram of a system including a device that supports hierarchical mobility in accordance with aspects of the present disclosure.

FIG. 14 shows a diagram of a system 1400 including a device 1405 that supports hierarchical mobility in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a network area associated with a user equipment operating in a radio resource control inactive state or a radio resource control idle state and transmit, by a base station, one or more network synchronization signals or one or more network paging signals within the network area based on the network area.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting hierarchical mobility).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

FIG. 15 shows a flowchart illustrating a method 1500 that supports hierarchical mobility in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may identify a radio resource control state of the UE from a set of states that includes a radio resource control inactive state and a radio resource control idle state. The operations of 1505 may be performed according to the methods described herein. In some examples, aspects of the operations of 1505 may be performed by an RRC state manager as described with reference to FIGS. 7 through 10.

At 1510, the UE may identify a network area for communicating one or more network synchronization signals or one or more network paging signals associated with the network area based on the radio resource control state of the UE. The operations of 1510 may be performed according to the methods described herein. In some examples, aspects of the operations of 1510 may be performed by a network area manager as described with reference to FIGS. 7 through 10.

At 1515, the UE may monitor for the one or more network synchronization signals or the one or more network paging signals associated with the network area based on identifying the network area. The operations of 1515 may be performed according to the methods described herein. In some examples, aspects of the operations of 1515 may be performed by a monitoring manager as described with reference to FIGS. 7 through 10.

FIG. 16 shows a flowchart illustrating a method 1600 that supports hierarchical mobility in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may identify a radio resource control state of the UE from a set of states that includes a radio resource control inactive state and a radio resource control idle state. The operations of 1605 may be performed according to the methods described herein. In some examples, aspects of the operations of 1605 may be performed by an RRC state manager as described with reference to FIGS. 7 through 10.

At 1610, the UE may identify a network area for communicating one or more network synchronization signals or one or more network paging signals associated with the network area based on the radio resource control state of the UE. The operations of 1610 may be performed according to the methods described herein. In some examples, aspects of the operations of 1610 may be performed by a network area manager as described with reference to FIGS. 7 through 10.

At 1615, the UE may identify, based on operating in the radio resource control inactive state or the radio resource idle state, a radio access network area code defined by a network, where the one or more network synchronization signals or the one or more network paging signals are associated with the radio access network area code. The operations of 1615 may be performed according to the methods described herein. In some examples, aspects of the operations of 1615 may be performed by a RAN-AC manager as described with reference to FIGS. 7 through 10.

At 1620, the UE may monitor for the one or more network synchronization signals or the one or more network paging signals associated with the network area based on identifying the network area. The operations of 1620 may be performed according to the methods described herein. In some examples, aspects of the operations of 1620 may be performed by a monitoring manager as described with reference to FIGS. 7 through 10.

Figure 17:
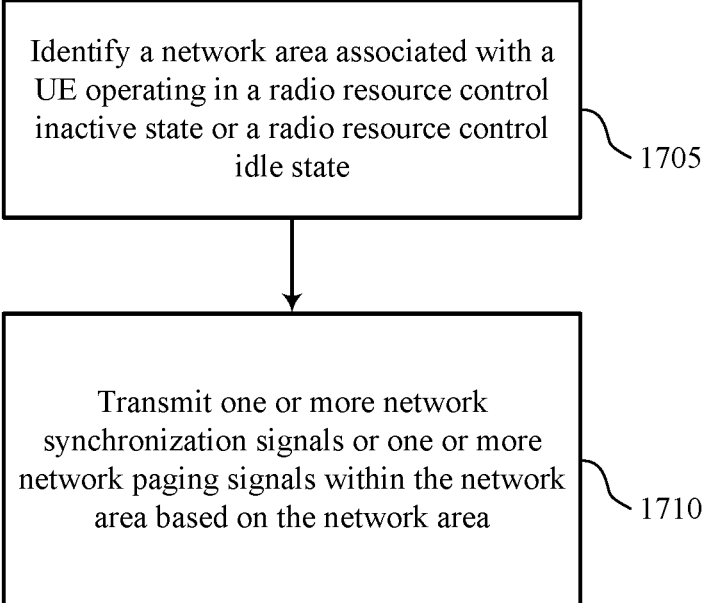

FIG. 17 shows a flowchart illustrating a method 1700 that supports hierarchical mobility in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may identify a network area associated with a UE operating in a radio resource control inactive state or a radio resource control idle state. The operations of 1705 may be performed according to the methods described herein. In some examples, aspects of the operations of 1705 may be performed by a network area manager as described with reference to FIGS. 11 through 14.

At 1710, the base station may transmit one or more network synchronization signals or one or more network paging signals within the network area based on the network area. The operations of 1710 may be performed according to the methods described herein. In some examples, aspects of the operations of 1710 may be performed by a network signal manager as described with reference to FIGS. 11 through 14.

FIG. 18 shows a flowchart illustrating a method 1800 that supports hierarchical mobility in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may identify a network area associated with a UE operating in a radio resource control inactive state or a radio resource control idle state. The operations of 1805 may be performed according to the methods described herein. In some examples, aspects of the operations of 1805 may be performed by a network area manager as described with reference to FIGS. 11 through 14.

At 1810, the base station may identify, based on the network area, communication resources assigned for the one or more network synchronization signals or the one or more network paging signals different than communication resources of neighboring network areas, where transmitting the one or more network synchronization signals or the one or more network paging signals within the network area is based on identifying the communication resources. The operations of 1810 may be performed according to the methods described herein. In some examples, aspects of the operations of 1810 may be performed by a resource manager as described with reference to FIGS. 11 through 14.

At 1815, the base station may transmit one or more network synchronization signals or one or more network paging signals within the network area based on the network area. The operations of 1815 may be performed according to the methods described herein. In some examples, aspects of the operations of 1815 may be performed by a network signal manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

identifying that a user equipment enters a radio resource control inactive state or a radio resource control idle state based at least in part on establishing a radio resource control connection;

identifying data to be communicated with the user equipment operating in the radio resource control inactive state or the radio resource control idle state based at least in part on identifying that the user equipment enters the radio resource control inactive state or the radio resource control idle state;

identifying a single-frequency network area associated with the user equipment operating in the radio resource control inactive state or the radio resource control idle state based at least in part on identifying the data; and transmitting, by a base station in a set of communication resources, one or more network synchronization signals or one or more network paging signals within the single-frequency network area based at least in part on identifying the single-frequency network area associated with the user equipment, the one or more network synchronization signals or the one or more network paging signals being associated with the single-frequency network area, wherein the set of communication resources is identified based at least in part on an identifier of the single-frequency network area, and wherein the one or more network synchronization signals or the one or more network paging signals are communicated using a single-beam signal above 6 GHz.

2. The method of claim 1, further comprising:

wherein the identified set of communication resources for transmission of the one or more network synchronization signals or the one or more network paging signals is different than communication resources of neighboring network areas.

3. The method of claim 1, wherein:

the single-frequency network area is associated with a radio resource control state of the user equipment.

4. The method of claim 3, further comprising:

establishing the radio resource control connection with the user equipment.

5. The method of claim 3, further comprising:

identifying that the user equipment is operating in a radio resource control connected state based at least in part on transmitting the one or more network synchronization signals or the one or more network paging signals within the single-frequency network area; and transmitting the data to be communicated to the user equipment based at least in part on identifying that the user equipment is operating in the radio resource control connected state.

6. The method of claim 1, further comprising:

receiving an indication of a radio access network based notification area established by the user equipment, wherein identifying the single-frequency network area is based at least in part on the indication of the radio access network based notification area received from the user equipment.

7. The method of claim 1, wherein:

the user equipment operates in the radio resource control inactive state; and the single-frequency network area is a radio access network area code defined by a network.

8. The method of claim 1, wherein:

the user equipment operates in the radio resource control inactive state; and the single-frequency network area is a radio access network based notification area established by the user equipment.

9. The method of claim 1, wherein:

the user equipment operates in the radio resource control idle state; and the single-frequency network area is a tracking area.

10. An apparatus for wireless communication, comprising:

one or more processors;

memory coupled with the one or more processors; and instructions stored in the memory and executable by the one or more processors, individually or in any combination, to cause the apparatus to:

identify that a user equipment enters a radio resource control inactive state or a radio resource control idle state based at least in part on establishing a radio resource control connection;

identify data to be communicated with the user equipment operating in the radio resource control inactive state or the radio resource control idle state based at least in part on identifying that the user equipment enters the radio resource control inactive state or the radio resource control idle state;

identify a single-frequency network area associated with the user equipment operating in the radio resource control inactive state or the radio resource control idle state based at least in part on identifying the data; and transmit, by a base station in a set of communication resources, one or more network synchronization signals or one or more network paging signals within the single-frequency network area based at least in part on identifying the single-frequency network area associated with the user equipment, the one or more network synchronization signals or the one or more network paging signals being associated with the single-frequency network area, wherein the set of communication resources is identified based at least in part on an identifier of the single-frequency network area, and wherein the one or more network synchronization signals or the one or more network paging signals are communicated using a single-beam signal above 6 GHZ.

11. The apparatus of claim 10, wherein the instructions are further executable by the one or more processors to cause the apparatus to:

wherein the identified set of communication resources for transmission of the one or more network synchronization signals or the one or more network paging signals is different than communication resources of neighboring network areas.

12. The apparatus of claim 10, wherein the single-frequency network area is associated with a radio resource control state of the user equipment.

13. The apparatus of claim 12, wherein the instructions are further executable by the one or more processors to cause the apparatus to:

establish the radio resource control connection with the user equipment.

14. The apparatus of claim 12, wherein the instructions are further executable by the one or more processors to cause the apparatus to:

identify that the user equipment is operating in a radio resource control connected state based at least in part on transmitting the one or more network synchronization signals or the one or more network paging signals within the single-frequency network area; and transmit the data to be communicated to the user equipment based at least in part on identifying that the user equipment is operating in the radio resource control connected state.

15. The apparatus of claim 10, wherein the instructions are further executable by the one or more processors to cause the apparatus to:

receive an indication of a radio access network based notification area established by the user equipment, wherein identifying the single-frequency network area is based at least in part on the indication of the radio access network based notification area received from the user equipment.

16. The apparatus of claim 10, wherein:

the user equipment operates in the radio resource control inactive state; and the single-frequency network area is a radio access network area code defined by a network.

17. The apparatus of claim 10, wherein:

the user equipment operates in the radio resource control inactive state; and the single-frequency network area is a radio access network based notification area established by the user equipment.

18. The apparatus of claim 10, wherein:

the user equipment operates in the radio resource control idle state; and the single-frequency network area is a tracking area.

19. A non-transitory computer-readable medium storing code for wireless communication, the code comprising instructions executable by a processor to:

identify that a user equipment enters a radio resource control inactive state or a radio resource control idle state based at least in part on establishing a radio resource control connection;

identify data to be communicated with the user equipment operating in the radio resource control inactive state or the radio resource control idle state based at least in part on identifying that the user equipment enters the radio resource control inactive state or the radio resource control idle state;

identify a single-frequency network area associated with the user equipment operating in the radio resource control inactive state or the radio resource control idle state based at least in part on identifying the data; and transmit, by a base station in a set of communication resources, one or more network synchronization signals or one or more network paging signals within the single-frequency network area based at least in part on identifying the single-frequency network area associated with the user equipment, the one or more network synchronization signals or the one or more network paging signals being associated with the single-frequency network area, wherein the set of communication resources is identified based at least in part on an identifier of the single-frequency network area, and wherein the one or more network synchronization signals or the one or more network paging signals are communicated using a single-beam signal above 6 GHz.

20. The non-transitory computer-readable medium of claim 19, wherein:

the identified set of communication resources for transmission of the one or more network synchronization signals or the one or more network paging signals is different than communication resources of neighboring network areas.

21. The non-transitory computer-readable medium of claim 19, wherein the single-frequency network area is associated with a radio resource control state of the user equipment.

22. The non-transitory computer-readable medium of claim 21, wherein the instructions are further executable by the processor to:

establish the radio resource control connection with the user equipment.

23. The non-transitory computer-readable medium of claim 21, wherein the instructions are further executable by the processor to:

identify that the user equipment is operating in a radio resource control connected state based at least in part on transmitting the one or more network synchronization signals or the one or more network paging signals within the single-frequency network area; and transmit the data to be communicated to the user equipment based at least in part on identifying that the user equipment is operating in the radio resource control connected state.

24. The non-transitory computer-readable medium of claim 19, wherein the instructions are further executable by the processor to:

receive an indication of a radio access network based notification area established by the user equipment, wherein identifying the single-frequency network area is based at least in part on the indication of the radio access network based notification area received from the user equipment.

25. The non-transitory computer-readable medium of claim 19, wherein:

the user equipment operates in the radio resource control inactive state; and the single-frequency network area is a radio access network area code defined by a network.

26. The non-transitory computer-readable medium of claim 19, wherein:

the user equipment operates in the radio resource control inactive state; and the single-frequency network area is a radio access network based notification area established by the user equipment.

27. The non-transitory computer-readable medium of claim 19, wherein:

the user equipment operates in the radio resource control idle state; and the single-frequency network area is a tracking area.

28. An apparatus for wireless communication, comprising:

means for identifying that a user equipment enters a radio resource control inactive state or a radio resource control idle state based at least in part on establishing a radio resource control connection;

means for identifying data to be communicated with the user equipment operating in the radio resource control inactive state or the radio resource control idle state based at least in part on identifying that the user equipment enters the radio resource control inactive state or the radio resource control idle state;

means for identifying a single-frequency network area associated with the user equipment operating in the radio resource control inactive state or the radio resource control idle state based at least in part on identifying the data; and means for transmitting, by a base station in a set of communication resources, one or more network synchronization signals or one or more network paging signals within the single-frequency network area based at least in part on identifying the single-frequency network area associated with the user equipment, the one or more network synchronization signals or the one or more network paging signals being associated with the single-frequency network area, wherein the set of communication resources is identified based at least in part on an identifier of the single-frequency network area, and wherein the one or more network synchronization signals or the one or more network paging signals are communicated using a single-beam signal above 6 GHz.

* * * * *

44